US012743925B2

(12) United States Patent
Rodd et al.

(10) Patent No.: US 12,743,925 B2
(45) Date of Patent: Sep. 22, 2026

(54) FOLDABLE SCREEN SUPPORT MECHANISM FOR GAMING MACHINES

(71) Applicant: Aristocrat Technologies, Inc., Las Vegas, NV (US)

(72) Inventors: Donald Rodd, Palm Beach Garden, FL (US); Timothy Barbour, Nolensville, TN (US)

(73) Assignee: Aristocrat Technologies, Inc., Las Vegas, NV (US)

( * ) Notice: Subject to any disclaimer, the term of this patent is extended or adjusted under 35 U.S.C. 154(b) by 182 days.

(21) Appl. No.: 18/633,254

(22) Filed: Apr. 11, 2024

(65) Prior Publication Data

US 2025/0322711 A1 Oct. 16, 2025

(51) Int. Cl.
*G07F 17/32* (2006.01)

(52) U.S. Cl.
CPC ...... *G07F 17/3216* (2013.01); *G07F 17/3211* (2013.01); *G07F 17/3267* (2013.01)

(58) Field of Classification Search
CPC ............. G07F 17/3216; G07F 17/3211; G07F 17/3267
See application file for complete search history.

(56) References Cited

U.S. PATENT DOCUMENTS

| | | | |
|---|---|---|---|
| 8,740,706 B2 | 6/2014 | Klein | |
| 10,872,490 B2 | 12/2020 | Winston | |
| 2003/0060270 A1 | 3/2003 | Binkley | |
| 2008/0113708 A1 * | 5/2008 | Beadell | A63F 13/30 463/31 |
| 2009/0233681 A1 * | 9/2009 | Tsukahara | G07F 17/3216 463/20 |
| 2012/0220363 A1 | 8/2012 | Bytnar | |
| 2019/0080553 A1 * | 3/2019 | Hohman | G07F 17/3216 |
| 2023/0267801 A1 | 8/2023 | Urban | |

* cited by examiner

*Primary Examiner* — Thomas H Henry
(74) *Attorney, Agent, or Firm* — Weaver Austin Villeneuve & Sampson LLP

(57) ABSTRACT

Mechanisms are disclosed that allow both display panels of a dual-display electronic gaming machine to be positioned such that their display surfaces face in the same, or generally the same, direction and form a relatively continuous aggregate display area. Such mechanisms also allow the secondary display panel to be pitched downward such that the display surface of the secondary display panel faces towards the display surface of the main display panel. In doing so, the secondary display panel may be rotated about a first axis positioned near where the main display panel and the secondary display panel met when forming the relatively contiguous display area and flipped upside down, thereby decreasing the height of the electronic gaming machine by approximately the height of the secondary display panel.

20 Claims, 24 Drawing Sheets

FOLDABLE SCREEN SUPPORT MECHANISM FOR GAMING MACHINES

BACKGROUND

Electronic gaming machines ("EGMs") or gaming devices provide a variety of wagering games such as slot games, video poker games, video blackjack games, roulette games, video bingo games, keno games and other types of games that are frequently offered at casinos and other locations. Play on EGMs typically involves a player establishing a credit balance by inputting money, or another form of monetary credit, and placing a monetary wager (from the credit balance) on one or more outcomes of an instance (or single play) of a primary or base game. In some cases, a player may qualify for a special mode of the base game, a secondary game, or a bonus round of the base game by attaining a certain winning combination or triggering event in, or related to, the base game, or after the player is randomly awarded the special mode, secondary game, or bonus round. In the special mode, secondary game, or bonus round, the player is given an opportunity to win extra game credits, game tokens or other forms of payout. In the case of "game credits" that are awarded during play, the game credits are typically added to a credit meter total on the EGM and can be provided to the player upon completion of a gaming session or when the player wants to "cash out."

"Slot" type games are often displayed to the player in the form of various symbols arrayed in a row-by-column grid or matrix. Specific matching combinations of symbols along predetermined paths (or paylines) through the matrix indicate the outcome of the game. The display typically highlights winning combinations/outcomes for identification by the player. Matching combinations and their corresponding awards are usually shown in a "pay-table" which is available to the player for reference. Often, the player may vary his/her wager to include differing numbers of paylines and/or the amount bet on each line. By varying the wager, the player may sometimes alter the frequency or number of winning combinations, frequency or number of secondary games, and/or the amount awarded.

Typical games use a random number generator (RNG) to randomly determine the outcome of each game. The game is designed to return a certain percentage of the amount wagered back to the player over the course of many plays or instances of the game, which is generally referred to as return to player (RTP). The RTP and randomness of the RNG ensure the fairness of the games and are highly regulated. Upon initiation of play, the RNG randomly determines a game outcome and symbols are then selected which correspond to that outcome. Notably, some games may include an element of skill on the part of the player and are therefore not entirely random.

SUMMARY

Discussed herein are designs for foldable screen support mechanisms for use in electronic gaming machines or other equipment having similar arrangements of screens. Modern electronic gaming machines have evolved considerably over the years, and some newer electronic gaming machines may include one or more large organic light-emitting diode (OLED), micro-light-emitting diode (micro LED), or other types of display panels that are used to display game graphics. In some instances, such display panels may be 42" or longer along a diagonal axis. Moreover, some electronic gaming machines may feature multiple, e.g., two, such display panels, with one such display panel being positioned directly beneath the other such display panel so as to form, in effect, a single, larger display area.

Such electronic gaming machines are imposing and attractive to players, are visible to spectators from further away, and also provide additional display real estate for showing game-related graphics, thereby providing greater flexibility to developers in terms of game mechanics and user interface design. However, the potential size of such electronic gaming machines also presents logistics challenges to the manufacturers and operators of such devices.

For example, electronic gaming machines are large devices that are usually packaged in crates or on shipping pallets and then loaded into shipping containers, tractor trailers, or other modes of transit. Once packaged for shipment, electronic gaming machines may need to be loaded into one or more vehicles for transport before arriving at their final destination-such vehicles often have limits on the maximum height of cargo that may be transported thereby. For example, a standard tractor trailer may have an interior height within the trailer of ~110", which may not accommodate many dual-display electronic gaming machines. Moreover, once such an electronic gaming machine is delivered to its destination, it may be necessary to transport the electronic gaming machine using elevators and/or through doorways, both of which may be even more limited in height (standard interior doorways are on the order of between 80" and 108" tall).

As a result, it is often the case that dual or multi-display electronic gaming machines are shipped in a partially assembled state, with the upper display panel being removed from the cabinet of the electronic gaming machine. After such an electronic gaming machine is delivered to its final destination, the final assembly may be completed on-site in order to place the electronic gaming machine into an operable state. This may require multiple technicians and specialized equipment, as it may be necessary to physically lift the upper display panel into place and then secure it to a display mount in the electronic gaming machine. There is also a risk of personnel injury or equipment damage, as such display panels are often large, heavy, and awkward to hold and may thus be difficult to support during the mounting process.

Disclosed herein are various mechanisms that may be integrated into a dual-display electronic gaming machine (or other system having similar arrangements of display panels) in order to allow the electronic gaming machine to be placed into either a shipping configuration or a deployed configuration without requiring removal or installation of any display panels. It will be appreciated that such mechanisms may also be used to support, for example, toppers (e.g., wheel displays) or other devices that may, when an electronic gaming machine is in its deployed or installed state, be supported above a display panel of the electronic gaming machine, i.e., the mechanisms in question are not limited to only being used for dual-display electronic gaming machines (or other dual-display devices), but may also be used in single-display devices in which it is desired to position some other device, e.g., a spinning wheel mechanism, above a display panel of the device.

Such mechanisms may be configured to allow both display panels of a dual-display electronic gaming machine, e.g., a main display panel and a secondary display panel positioned above the main display panel, to be positioned such that their display surfaces face in the same, or generally the same, direction and form a relatively continuous aggregate display area (the term "relatively continuous" is used since there will most likely be a small gap or seam between the display surfaces of the two display panels along the edges of the two display panels that are closest to one another). For clarity, the term "display surface," as used herein, refers to the surface of a display panel on which graphical content is displayed when the display panel is used to display such graphical content. Such mechanisms may also be configured, however, to allow the secondary display panel to be pitched downward such that the display surface of the secondary display panel (this display surface may be referred to herein as a "secondary display surface") faces towards the display surface of the main display panel (this display surface may be referred to herein as a "main display surface"). In doing so, the secondary display panel may be rotated about a first axis positioned near where the main display panel and the secondary display panel met when forming the relatively contiguous display area and flipped upside down, thereby decreasing the height of the electronic gaming machine by approximately the height of the secondary display panel (when in its deployed state).

Such a mechanism may be particularly effective when integrating other mechanisms that may assist with transitioning the secondary display between its stowed state and its deployed state, although the mechanism, at its broadest, may generally have the features or characteristics set forth above. These and other aspects of such apparatuses are discussed below in more detail and with respect to the Figures but include at least the following implementations.

In some implementations, an apparatus may be provided that includes a support structure having a first portion and a second portion, a first mount connected with, and supported by, the first portion of the support structure, and a second mount connected with, and supported by, the second portion of the support structure. The first mount may include one or more first mounting features and the second mount may include one or more second mounting features. The one or more second mounting features may be configured to support a main display panel, and the one or more first mounting features may be configured to support a secondary display panel or a topper. The first mount may be rotatably connected with the first portion of the support structure so as to be rotatable about a first axis and between a first rotational position relative to the first portion of the support structure and a second rotational position relative to the first portion of the support structure, and the second mount may be positioned between the second portion of the support structure and at least a portion of the first mount when the first mount is in the first rotational position relative to the first portion of the support structure.

In some such implementations, the amount of angular rotation that the first mount undergoes when transitioning between the first rotational position relative to the first portion of the support structure and the second rotational position relative to the first portion of the support structure may be between 100° and 180°.

In some implementations, the support structure may have a stationary portion and a movable portion, the movable portion may include the first portion of the support structure and the second portion of the support structure, the movable portion may be configured to be movable along a first path relative to the stationary portion and between a stowed position and a deployed position, and the first mount may be kinematically linked with the stationary portion such that the first mount rotates from the first rotational position to the second rotational position when the movable portion is moved from the stowed position to the deployed position.

In some such implementations, the support structure may include a rack and pinion, the rack may be part of the stationary portion, the pinion may be part of the movable portion, and the pinion may be engaged with the rack and is kinematically linked with the first mount such that rotation of the pinion causes rotation of the first mount about the first axis.

In some further such implementations, the apparatus may further include a drive sprocket connected with the pinion and a driven sprocket connected with the first mount, as well as a chain spanning between the driven sprocket and the drive sprocket. The chain may be engaged with teeth on the driven sprocket and teeth on the drive sprocket.

In some implementations, the apparatus may further include a drive pulley connected with the pinion and a driven pulley connected with the first mount, as well as a belt spanning between the driven pulley and the drive pulley. The belt may be engaged with the driven pulley and the drive pulley.

In some implementations, one of the movable portion and the stationary portion may include an arcuate guide, while the other of the movable portion and the stationary portion may include a plurality of guide engagement features that contact the guide. In such implementations, the rack may have teeth arranged along a second path, and the first path and the second path may both be arcuate.

In some such implementations, the first path and the second path may be concentric to within ±1 inch, and the first path and the second path may each have a corresponding radius that is greater than or equal to 70 inches.

In some implementations, the apparatus may further include a cabinet having a rear wall and a base. The apparatus may also include a gaming controller. The stationary portion of the support structure may be fixed with respect to the cabinet, and the gaming controller may be positioned between the stationary portion of the support structure and the base of the cabinet, and between the movable portion of the support structure and the rear wall of the cabinet.

In some implementations, the apparatus may further include the main display panel and the secondary display panel. The one or more first mounting features may support the secondary display panel, and the one or more second mounting features may support the main display panel. The second mount and the second portion of the support structure may be configured to be placed into at least a first configuration relative to the first portion of the support structure. The main display surface may have a first edge that is closest to the first axis, while the secondary display surface may have a first edge that is closest to the first axis. The main display surface may also have a first portion that extends from the first edge of the main display surface towards a center of the main display surface, while the secondary display surface may have a first portion that extends from the first edge of the secondary display surface towards a center of the secondary display surface. The first edge of the main display surface and the first edge of the secondary display surface may be adjacent one another when the first mount is in the second rotational position and the second mount and the second portion of the support structure are in the first configuration. The first portion of the main display surface may smoothly transitions to the first portion of the secondary display surface when the first mount is in the second rotational position and the second mount and the second portion of the support structure are in the first configuration, and the main display surface may face towards the secondary display surface, and vice-versa, when the first mount is in the first rotational position.

In some implementations, the main display surface may have a first side edge that is curved and that may extend away from the first edge of the main display surface, while the secondary display surface may have a first side edge that is curved and that may extend away from the first edge of the secondary display surface. The first side edge of the main display surface and the first side edge of the secondary display surface may define different segments of a smooth curve when the first mount is in the second rotational position.

In some such implementations, the smooth curve may be arcuate or parabolic.

In some implementations, the first side edge of the main display surface and the first side edge of the secondary display surface may both be arcuate.

In some implementations, the second mount and the second portion of the support structure may be further configured to also be placed into at least a second configuration relative to the first portion of the support structure, the second mount and the second portion of the support structure may be configured to be movable along a second path and relative to the first portion of the support structure in order to transition between the first configuration and the second configuration, the second portion of the support structure may be closer to the first axis when the second mount and the second portion of the support structure are in the first configuration than when in the second configuration, and part of the secondary display panel, when the first mount is in the first rotational position relative to the first portion of the support structure and the second mount and the second portion of the support structure are in the second configuration, may occupy a region occupied by part of the main display panel when the second mount and the second portion of the support structure are in the first configuration and the first mount is in the second rotational position relative to the first portion of the support structure.

In some implementations, the second mount may include a) a first link assembly that is rotatably connected with both the second portion of the support structure and the main display panel and b) a second link assembly that is rotatably connected with both the second portion of the support structure and the main display panel. The first link assembly and the second link assembly may form part of a kinematic linkage that is configured such that the main display panel is movable between an extended state relative to the second portion of the support structure and a retracted state relative to the second portion of the support structure, and the main display panel may be further from the first portion of the support structure when in the extended state as compared with when the main display panel is in the retracted state.

In some implementations, the apparatus may further include a button deck and a cabinet having a rear wall. The stationary portion of the support structure may be fixed relative to the cabinet, at least the second portion of the support structure may be between the main display panel and the rear wall, the button deck may be rotatable between a shipping configuration and an installed configuration, the button deck, when the button deck is in the shipping configuration, the second portion of the support structure is in the second configuration, and the movable portion of the support structure is in the stowed position, may occupy a region that is in between the main display panel and the secondary display panel, and the main display panel, when the button deck is in the installed configuration, the second portion of the support structure is in the first configuration, and the movable portion of the support structure is in the deployed position, may be interposed between the button deck and the secondary display panel.

In some implementations, the apparatus may further include a button deck and a cabinet having a rear wall. The stationary portion of the support structure may be fixed with respect to the cabinet, at least the second portion of the support structure may be between the main display panel and the rear wall, the button deck may be slidable between a shipping configuration and an installed configuration, the button deck, when the button deck is in the shipping configuration, the second portion of the support structure is in the second configuration, and the movable portion of the support structure is in the stowed position, may occupy a region that is in between the main display panel and the secondary display panel, and the main display panel, when the button deck is in the installed configuration, the second portion of the support structure is in the first configuration, and the movable portion of the support structure is in the deployed position, may be interposed between the button deck and the secondary display panel.

In some implementations, the apparatus may further include an actuator configured to move the movable portion of the support structure from the stowed position to the deployed position responsive to the receipt of one or more inputs.

In some such implementations, the apparatus may further include a cabinet. The actuator may be a winch mechanism with a cable, strap, or chain, the stationary portion of the support structure may be fixed with respect to the cabinet, the winch mechanism may have a base that is fixed with respect to the cabinet and that may be located between a base of the cabinet and the stationary portion of the support structure, and the cable, strap, or chain of the winch mechanism may extend from the winch mechanism and into the stationary portion of the support structure before reversing direction and connecting with the movable portion of the support structure.

In some implementations, the apparatus may further include a motor configured to drive the actuator, and a controller configured to control the motor so as to drive the actuator and move the movable portion of the support structure from the stowed position to the deployed position.

It will be understood that the examples shown in the Figures are not intended to be limiting, and that various other implementations will be apparent to those in the art.

DETAILED DESCRIPTION

Figure 1:
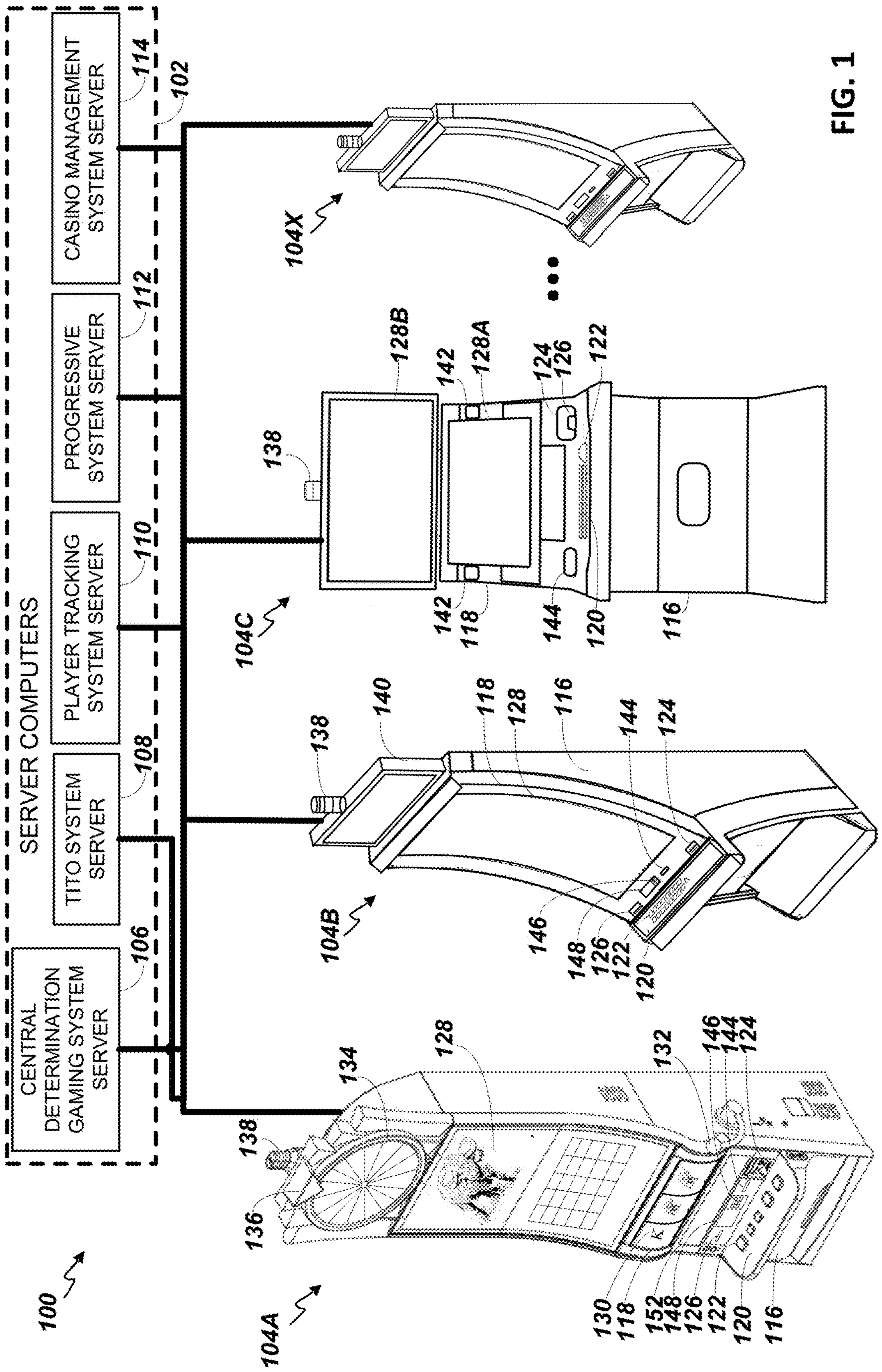
FIG. 1 is an exemplary diagram showing several EGMs networked with various gaming-related servers.

FIG. 1 illustrates several different models of EGMs which may be networked to various gaming-related servers. Shown is a system 100 in a gaming environment including one or more server computers 102 (e.g., slot servers of a casino) that are in communication, via a communications network, with one or more gaming devices 104A-104X (EGMs, slots, video poker, bingo machines, etc.) that can implement one or more aspects of the present disclosure. The gaming devices 104A-104X may alternatively be portable and/or remote gaming devices such as, but not limited to, a smart phone, a tablet, a laptop, or a game console. Gaming devices 104A-104X utilize specialized software and/or hardware to form non-generic, particular machines or apparatuses that comply with regulatory requirements regarding devices used for wagering or games of chance that provide monetary awards.

Communication between the gaming devices 104A-104X and the server computers 102, and among the gaming devices 104A-104X, may be direct or indirect using one or more communication protocols. As an example, gaming devices 104A-104X and the server computers 102 can communicate over one or more communication networks, such as over the Internet through a website maintained by a computer on a remote server or over an online data network including commercial online service providers, Internet service providers, private networks (e.g., local area networks and enterprise networks), and the like (e.g., wide area networks). The communication networks could allow gaming devices 104A-104X to communicate with one another and/or the server computers 102 using a variety of communication-based technologies, such as radio frequency (RF) (e.g., wireless fidelity (WiFi®) and Bluetooth®), cable TV, satellite links and the like.

In some implementations, server computers 102 may not be necessary and/or preferred. For example, in one or more implementations, a stand-alone gaming device such as gaming device 104A, gaming device 104B or any of the other gaming devices 104C-104X can implement one or more aspects of the present disclosure. However, it is typical to find multiple EGMs connected to networks implemented with one or more of the different server computers 102 described herein.

The server computers 102 may include a central determination gaming system server 106, a ticket-in-ticket-out (TITO) system server 108, a player tracking system server 110, a progressive system server 112, and/or a casino management system server 114. Gaming devices 104A-104X may include features to enable operation of any or all servers for use by the player and/or operator (e.g., the casino, resort, gaming establishment, tavern, pub, etc.). For example, game outcomes may be generated on a central determination gaming system server 106 and then transmitted over the network to any of a group of remote terminals or remote gaming devices 104A-104X that utilize the game outcomes and display the results to the players.

Gaming device 104A is often of a cabinet construction which may be aligned in rows or banks of similar devices for placement and operation on a casino floor. The gaming device 104A often includes a main door which provides access to the interior of the cabinet. Gaming device 104A typically includes a button area or button deck 120 accessible by a player that is configured with input switches or buttons 122, an access channel for a bill validator 124, and/or an access channel for a ticket-out printer 126.

In FIG. 1, gaming device 104A is shown as a Relm XL™ model gaming device manufactured by Aristocrat® Technologies, Inc. As shown, gaming device 104A is a reel machine having a gaming display area 118 comprising a number (typically 3 or 5) of mechanical reels 130 with various symbols displayed on them. The mechanical reels 130 are independently spun and stopped to show a set of symbols within the gaming display area 118 which may be used to determine an outcome to the game.

In many configurations, the gaming device 104A may have a main display 128 (e.g., video display monitor) mounted to, or above, the gaming display area 118. The main display 128 can be a high-resolution liquid crystal display (LCD), plasma, light emitting diode (LED), or organic light emitting diode (OLED) panel which may be flat or curved as shown, a cathode ray tube, or other conventional electronically controlled video monitor.

In some implementations, the bill validator 124 may also function as a "ticket-in" reader that allows the player to use a casino issued credit ticket to load credits onto the gaming device 104A (e.g., in a cashless ticket ("TITO") system). In such cashless implementations, the gaming device 104A may also include a "ticket-out" printer 126 for outputting a credit ticket when a "cash out" button is pressed. Cashless TITO systems are used to generate and track unique barcodes or other indicators printed on tickets to allow players to avoid the use of bills and coins by loading credits using a ticket reader and cashing out credits using a ticket-out printer 126 on the gaming device 104A. The gaming device 104A can have hardware meters for purposes including ensuring regulatory compliance and monitoring the player credit balance. In addition, there can be additional meters that record the total amount of money wagered on the gaming device, total amount of money deposited, total amount of money withdrawn, total amount of winnings on gaming device 104A.

In some implementations, a player tracking card reader 144, a transceiver for wireless communication with a mobile device (e.g., a player's smartphone), a keypad 146, and/or an illuminated display 148 for reading, receiving, entering, and/or displaying player tracking information is provided in gaming device 104A. In such implementations, a game controller within the gaming device 104A can communicate with the player tracking system server 110 to send and receive player tracking information.

Gaming device 104A may also include a bonus topper wheel 134. When bonus play is triggered (e.g., by a player achieving a particular outcome or set of outcomes in the primary game), bonus topper wheel 134 is operative to spin and stop with indicator arrow 136 indicating the outcome of the bonus game. Bonus topper wheel 134 is typically used to play a bonus game, but it could also be incorporated into play of the base or primary game.

A candle 138 may be mounted on the top of gaming device 104A and may be activated by a player (e.g., using a switch or one of buttons 122) to indicate to operations staff that gaming device 104A has experienced a malfunction or the player requires service. The candle 138 is also often used to indicate a jackpot has been won and to alert staff that a hand payout of an award may be needed.

There may also be one or more information panels 152 which may be a back-lit, silkscreened glass panel with lettering to indicate general game information including, for example, a game denomination (e.g., $0.25 or $1), pay lines, pay tables, and/or various game related graphics. In some implementations, the information panel(s) 152 may be implemented as an additional video display.

Gaming devices 104A have traditionally also included a handle 132 typically mounted to the side of main cabinet 116 which may be used to initiate game play.

Figure 2A:
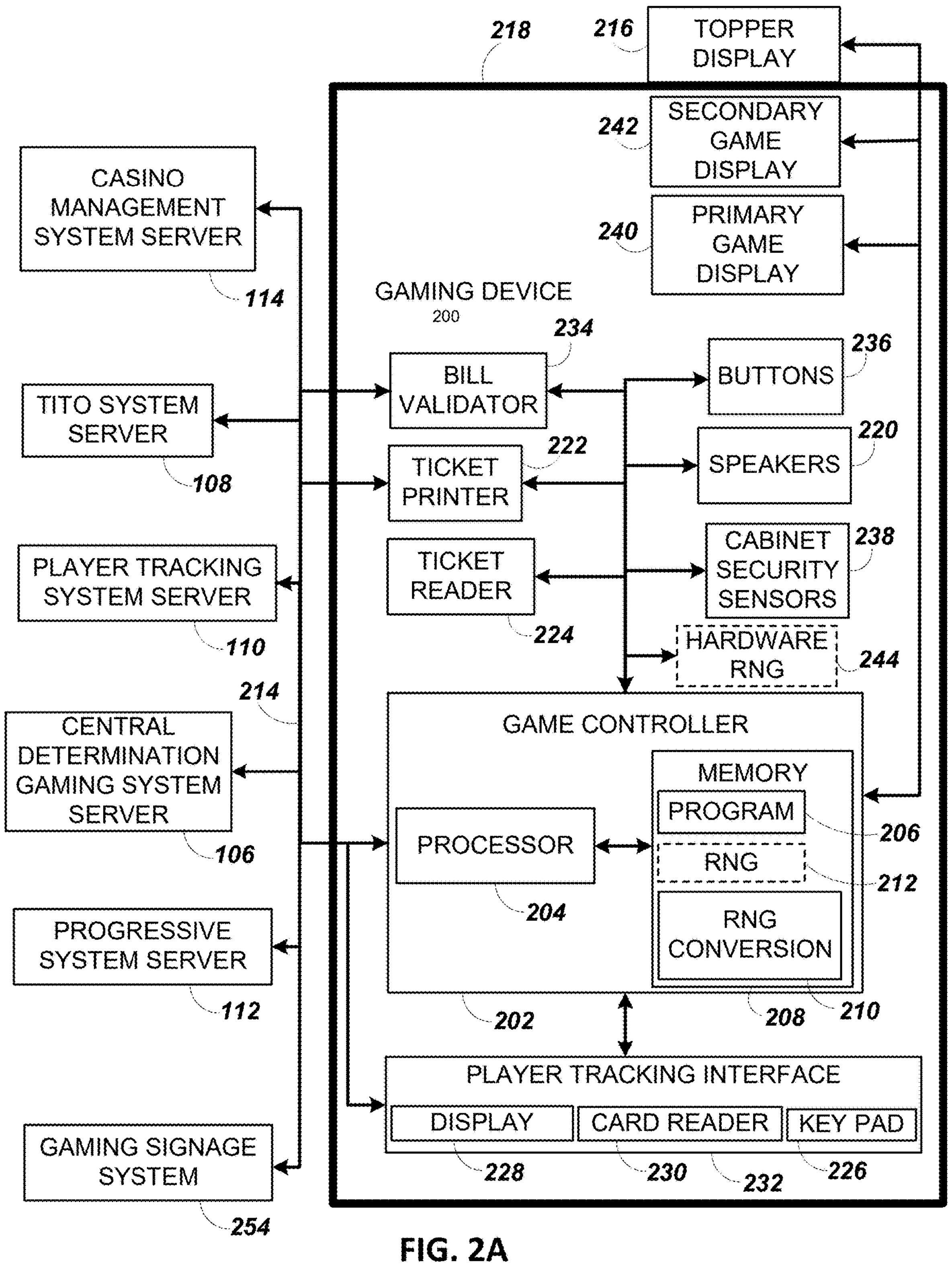
FIG. 2A is a block diagram showing various functional elements of an exemplary EGM.

Many or all the above-described components can be controlled by circuitry (e.g., a game controller) housed inside the main cabinet 116 of the gaming device 104A, the details of which are shown in FIG. 2A.

An alternative example gaming device 104B illustrated in FIG. 1 is the Arc™ model gaming device manufactured by Aristocrat® Technologies, Inc. Note that where possible, reference numerals identifying similar features of the gaming device 104A implementation are also identified in the gaming device 104B implementation using the same reference numbers. Gaming device 104B does not include physical reels and instead shows game play functions on main display 128. An optional topper screen 140 may be used as a secondary game display for bonus play, to show game features or attraction activities while a game is not in play, or any other information or media desired by the game designer or operator. In some implementations, the optional topper screen 140 may also or alternatively be used to display progressive jackpot prizes available to a player during play of gaming device 104B.

Example gaming device 104B includes a main cabinet 116 including a main door which opens to provide access to the interior of the gaming device 104B. The main or service door is typically used by service personnel to refill the ticket-out printer 126 and collect bills and tickets inserted into the bill validator 124. The main or service door may also be accessed to reset the machine, verify and/or upgrade the software, and for general maintenance operations.

Another example gaming device 104C shown is the Helix™ model gaming device manufactured by Aristocrat® Technologies, Inc. Gaming device 104C includes a main display 128A that is in a landscape orientation. Although not illustrated by the front view provided, the main display 128A may have a curvature radius from top to bottom, or alternatively from side to side. In some implementations, main display 128A is a flat panel display. Main display 128A is typically used for primary game play while secondary display 128B is typically used for bonus game play, to show game features or attraction activities while the game is not in play or any other information or media desired by the game designer or operator. In some implementations, example gaming device 104C may also include speakers 142 to output various audio such as game sound, background music, etc.

Many different types of games, including mechanical slot games, video slot games, video poker, video black jack, video pachinko, keno, bingo, and lottery, may be provided with or implemented within the depicted gaming devices 104A-104C and other similar gaming devices. Each gaming device may also be operable to provide many different games. Games may be differentiated according to themes, sounds, graphics, type of game (e.g., slot game vs. card game vs. game with aspects of skill), denomination, number of paylines, maximum jackpot, progressive or non-progressive, bonus games, and may be deployed for operation in Class 2 or Class 3, etc.

FIG. 2A is a block diagram depicting exemplary internal electronic components of a gaming device 200 connected to various external systems. All or parts of the gaming device 200 shown could be used to implement any one of the example gaming devices 104A-X depicted in FIG. 1. As shown in FIG. 2A, gaming device 200 includes a topper display 216 or another form of a top box (e.g., a topper wheel, a topper screen, etc.) that sits above cabinet 218. Cabinet 218 or topper display 216 may also house a number of other components which may be used to add features to a game being played on gaming device 200, including speakers 220, a ticket printer 222 which prints bar-coded tickets or other media or mechanisms for storing or indicating a player's credit value, a ticket reader 224 which reads bar-coded tickets or other media or mechanisms for storing or indicating a player's credit value, and a player tracking interface 232. Player tracking interface 232 may include a keypad 226 for entering information, a player tracking display 228 for displaying information (e.g., an illuminated or video display), a card reader 230 for receiving data and/or communicating information to and from media or a device such as a smart phone enabling player tracking. FIG. 2 also depicts utilizing a ticket printer 222 to print tickets for a TITO system server 108. Gaming device 200 may further include a bill validator 234, player-input buttons 236 for player input, cabinet security sensors 238 to detect unauthorized opening of the cabinet 218, a primary game display 240, and a secondary game display 242, each coupled to and operable under the control of game controller 202.

The games available for play on the gaming device 200 are controlled by a game controller 202 that includes one or more processors 204. Processor 204 represents a general-purpose processor, a specialized processor intended to perform certain functional tasks, or a combination thereof. As an example, processor 204 can be a central processing unit (CPU) that has one or more multi-core processing units and memory mediums (e.g., cache memory) that function as buffers and/or temporary storage for data. Alternatively, processor 204 can be a specialized processor, such as an application specific integrated circuit (ASIC), graphics processing unit (GPU), field-programmable gate array (FPGA), digital signal processor (DSP), or another type of hardware accelerator. In another example, processor 204 is a system on chip (SoC) that combines and integrates one or more general-purpose processors and/or one or more specialized processors. Although FIG. 2A illustrates that game controller 202 includes a single processor 204, game controller 202 is not limited to this representation and instead can include multiple processors 204 (e.g., two or more processors).

FIG. 2A illustrates that processor 204 is operatively coupled to memory 208. Memory 208 is defined herein as including volatile and nonvolatile memory and other types of non-transitory data storage components. Volatile memory is memory that do not retain data values upon loss of power. Nonvolatile memory is memory that do retain data upon a loss of power. Examples of memory 208 include random access memory (RAM), read-only memory (ROM), hard disk drives, solid-state drives, universal serial bus (USB) flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, examples of RAM include static random access memory (SRAM), dynamic random access memory (DRAM), magnetic random access memory (MRAM), and other such devices. Examples of ROM include a programmable read-only memory (PROM), an erasable programmable read-only memory (EPROM), an electrically erasable programmable read-only memory (EEPROM), or other like memory device. Even though FIG. 2A illustrates that game controller 202 includes a single memory 208, game controller 202 could include multiple memories 208 for storing program instructions and/or data.

Memory 208 can store one or more game programs 206 that provide program instructions and/or data for carrying out various implementations (e.g., game mechanics) described herein. Stated another way, game program 206 represents an executable program stored in any portion or component of memory 208. In one or more implementations, game program 206 is embodied in the form of source code that includes human-readable statements written in a programming language or machine code that contains numerical instructions recognizable by a suitable execution system, such as a processor 204 in a game controller or other system. Examples of executable programs include: (1) a compiled program that can be translated into machine code in a format that can be loaded into a random access portion of memory 208 and run by processor 204; (2) source code that may be expressed in proper format such as object code that is capable of being loaded into a random access portion of memory 208 and executed by processor 204; and (3) source code that may be interpreted by another executable program to generate instructions in a random access portion of memory 208 to be executed by processor 204.

Alternatively, game programs 206 can be set up to generate one or more game instances based on instructions and/or data that gaming device 200 exchanges with one or more remote gaming devices, such as a central determination gaming system server 106 (not shown in FIG. 2A but shown in FIG. 1). For purpose of this disclosure, the term "game instance" refers to a play or a round of a game that gaming device 200 presents (e.g., via a user interface (UI)) to a player. The game instance is communicated to gaming device 200 via the network 214 and then displayed on gaming device 200. For example, gaming device 200 may execute game program 206 as video streaming software that allows the game to be displayed on gaming device 200. When a game is stored on gaming device 200, it may be loaded from memory 208 (e.g., from a read only memory (ROM)) or from the central determination gaming system server 106 to memory 208.

Gaming devices, such as gaming device 200, are highly regulated to ensure fairness and, in many cases, gaming device 200 is operable to award monetary awards (e.g., typically dispensed in the form of a redeemable voucher). Therefore, to satisfy security and regulatory requirements in a gaming environment, hardware and software architectures are implemented in gaming devices 200 that differ significantly from those of general-purpose computers. Adapting general purpose computers to function as gaming devices 200 is not simple or straightforward because of: (1) the regulatory requirements for gaming devices 200, (2) the harsh environment in which gaming devices 200 operate, (3) security requirements, (4) fault tolerance requirements, and (5) the requirement for additional special purpose componentry enabling functionality of an EGM. These differences require substantial engineering effort with respect to game design implementation, game mechanics, hardware components, and software.

One regulatory requirement for games running on gaming device 200 generally involves complying with a certain level of randomness. Typically, gaming jurisdictions mandate that gaming devices 200 satisfy a minimum level of randomness without specifying how a gaming device 200 should achieve this level of randomness. To comply, FIG. 2A illustrates that gaming device 200 could include an RNG 212 that utilizes hardware and/or software to generate RNG outcomes that lack any pattern. The RNG operations are often specialized and non-generic in order to comply with regulatory and gaming requirements. For example, in a slot game, game program 206 can initiate multiple RNG calls to RNG 212 to generate RNG outcomes, where each RNG call and RNG outcome corresponds to an outcome for a reel. In another example, gaming device 200 can be a Class II gaming device where RNG 212 generates RNG outcomes for creating Bingo cards. In one or more implementations, RNG 212 could be one of a set of RNGs operating on gaming device 200. More generally, an output of the RNG 212 can be the basis on which game outcomes are determined by the game controller 202. Game developers could vary the degree of true randomness for each RNG (e.g., pseudorandom) and utilize specific RNGs depending on game requirements. The output of the RNG 212 can include a random number or pseudorandom number (either is generally referred to as a "random number").

In FIG. 2A, RNG 212 and hardware RNG 244 are shown in dashed lines to illustrate that RNG 212, hardware RNG 244, or both can be included in gaming device 200. In one implementation, instead of including RNG 212, gaming device 200 could include a hardware RNG 244 that generates RNG outcomes. Analogous to RNG 212, hardware RNG 244 performs specialized and non-generic operations in order to comply with regulatory and gaming requirements. For example, because of regulation requirements, hardware RNG 244 could be a random number generator that securely produces random numbers for cryptography use. The gaming device 200 then uses the secure random numbers to generate game outcomes for one or more game features. In another implementation, the gaming device 200 could include both hardware RNG 244 and RNG 212. RNG 212 may utilize the RNG outcomes from hardware RNG 244 as one of many sources of entropy for generating secure random numbers for the game features.

Another regulatory requirement for running games on gaming device 200 includes ensuring a certain level of RTP. Similar to the randomness requirement discussed above, numerous gaming jurisdictions also mandate that gaming device 200 provides a minimum level of RTP (e.g., RTP of at least 75%). A game can use one or more lookup tables (also called weighted tables) as part of a technical solution that satisfies regulatory requirements for randomness and RTP. In particular, a lookup table can integrate game features (e.g., trigger events for special modes or bonus games; newly introduced game elements such as extra reels, new symbols, or new cards; stop positions for dynamic game elements such as spinning reels, spinning wheels, or shifting reels; or card selections from a deck) with random numbers generated by one or more RNGs, so as to achieve a given level of volatility for a target level of RTP. (In general, volatility refers to the frequency or probability of an event such as a special mode, payout, etc. For example, for a target level of RTP, a higher-volatility game may have a lower payout most of the time with an occasional bonus having a very high payout, while a lower-volatility game has a steadier payout with more frequent bonuses of smaller amounts.) Configuring a lookup table can involve engineering decisions with respect to how RNG outcomes are mapped to game outcomes for a given game feature, while still satisfying regulatory requirements for RTP. Configuring a lookup table can also involve engineering decisions about whether different game features are combined in a given entry of the lookup table or split between different entries (for the respective game features), while still satisfying regulatory requirements for RTP and allowing for varying levels of game volatility.

FIG. 2A illustrates that gaming device 200 includes an RNG conversion engine 210 that translates the RNG outcome from RNG 212 to a game outcome presented to a player. To meet a designated RTP, a game developer can set up the RNG conversion engine 210 to utilize one or more lookup tables to translate the RNG outcome to a symbol element, stop position on a reel strip layout, and/or randomly chosen aspect of a game feature. As an example, the lookup tables can regulate a prize payout amount for each RNG outcome and how often the gaming device 200 pays out the prize payout amounts. The RNG conversion engine 210 could utilize one lookup table to map the RNG outcome to a game outcome displayed to a player and a second lookup table as a pay table for determining the prize payout amount for each game outcome. The mapping between the RNG outcome to the game outcome controls the frequency in hitting certain prize payout amounts.

FIG. 2A also depicts that gaming device 200 is connected over network 214 to player tracking system server 110. Player tracking system server 110 may be, for example, an OASIS® system manufactured by Aristocrat® Technologies, Inc. Player tracking system server 110 is used to track play (e.g., amount wagered, games played, time of play and/or other quantitative or qualitative measures) for individual players so that an operator may reward players in a loyalty program. The player may use the player tracking interface 232 to access his/her account information, activate free play, and/or request various information. Player tracking or loyalty programs seek to reward players for their play and help build brand loyalty to the gaming establishment. The rewards typically correspond to the player's level of patronage (e.g., to the player's playing frequency and/or total amount of game plays at a given casino). Player tracking rewards may be complimentary and/or discounted meals, lodging, entertainment and/or additional play. Player tracking information may be combined with other information that is now readily obtainable by a casino management system.

When a player wishes to play the gaming device 200, he/she can insert cash or a ticket voucher through a coin acceptor (not shown) or bill validator 234 to establish a credit balance on the gaming device. The credit balance is used by the player to place wagers on instances of the game and to receive credit awards based on the outcome of winning instances. The credit balance is decreased by the amount of each wager and increased upon a win. The player can add additional credits to the balance at any time. The player may also optionally insert a loyalty club card into the card reader 230. During the game, the player views with one or more UIs, the game outcome on one or more of the primary game display 240 and secondary game display 242. Other game and prize information may also be displayed.

For each game instance, a player may make selections, which may affect play of the game. For example, the player may vary the total amount wagered by selecting the amount bet per line and the number of lines played. In many games, the player is asked to initiate or select options during course of game play (such as spinning a wheel to begin a bonus round or select various items during a feature game). The player may make these selections using the player-input buttons 236, the primary game display 240 which may be a touch screen, or using some other device which enables a player to input information into the gaming device 200.

During certain game events, the gaming device 200 may display visual and auditory effects that can be perceived by the player. These effects add to the excitement of a game, which makes a player more likely to enjoy the playing experience. Auditory effects include various sounds that are projected by the speakers 220. Visual effects include flashing lights, strobing lights or other patterns displayed from lights on the gaming device 200 or from lights behind the information panel 152 (FIG. 1).

When the player is done, he/she cashes out the credit balance (typically by pressing a cash out button to receive a ticket from the ticket printer 222). The ticket may be "cashed-in" for money or inserted into another machine to establish a credit balance for play.

Additionally, or alternatively, gaming devices 104A-104X and 200 can include or be coupled to one or more wireless transmitters, receivers, and/or transceivers (not shown in FIGS. 1 and 2A) that communicate (e.g., Bluetooth® or other near-field communication technology) with one or more mobile devices to perform a variety of wireless operations in a casino environment. Examples of wireless operations in a casino environment include detecting the presence of mobile devices, performing credit, points, comps, or other marketing or hard currency transfers, establishing wagering sessions, and/or providing a personalized casino-based experience using a mobile application. In one implementation, to perform these wireless operations, a wireless transmitter or transceiver initiates a secure wireless connection between a gaming device 104A-104X and 200 and a mobile device. After establishing a secure wireless connection between the gaming device 104A-104X and 200 and the mobile device, the wireless transmitter or transceiver does not send and/or receive application data to and/or from the mobile device. Rather, the mobile device communicates with gaming devices 104A-104X and 200 using another wireless connection (e.g., WiFi® or cellular network). In another implementation, a wireless transceiver establishes a secure connection to directly communicate with the mobile device. The mobile device and gaming device 104A-104X and 200 sends and receives data utilizing the wireless transceiver instead of utilizing an external network. For example, the mobile device would perform digital wallet transactions by directly communicating with the wireless transceiver. In one or more implementations, a wireless transmitter could broadcast data received by one or more mobile devices without establishing a pairing connection with the mobile devices.

Although FIGS. 1 and 2A illustrate specific implementations of a gaming device (e.g., gaming devices 104A-104X and 200), the disclosure is not limited to those implementations shown in FIGS. 1 and 2. For example, not all gaming devices suitable for implementing implementations of the present disclosure necessarily include top wheels, top boxes, information panels, cashless ticket systems, and/or player tracking systems. Further, some suitable gaming devices have only a single game display that includes only a mechanical set of reels and/or a video display, while others are designed for bar counters or tabletops and have displays that face upwards. Gaming devices 104A-104X and 200 may also include other processors that are not separately shown. Using FIG. 2A as an example, gaming device 200 could include display controllers (not shown in FIG. 2A) configured to receive video input signals or instructions to display images on game displays 240 and 242. Alternatively, such display controllers may be integrated into the game controller 202. The use and discussion of FIGS. 1 and 2 are examples to facilitate ease of description and explanation.

Figure 2B:
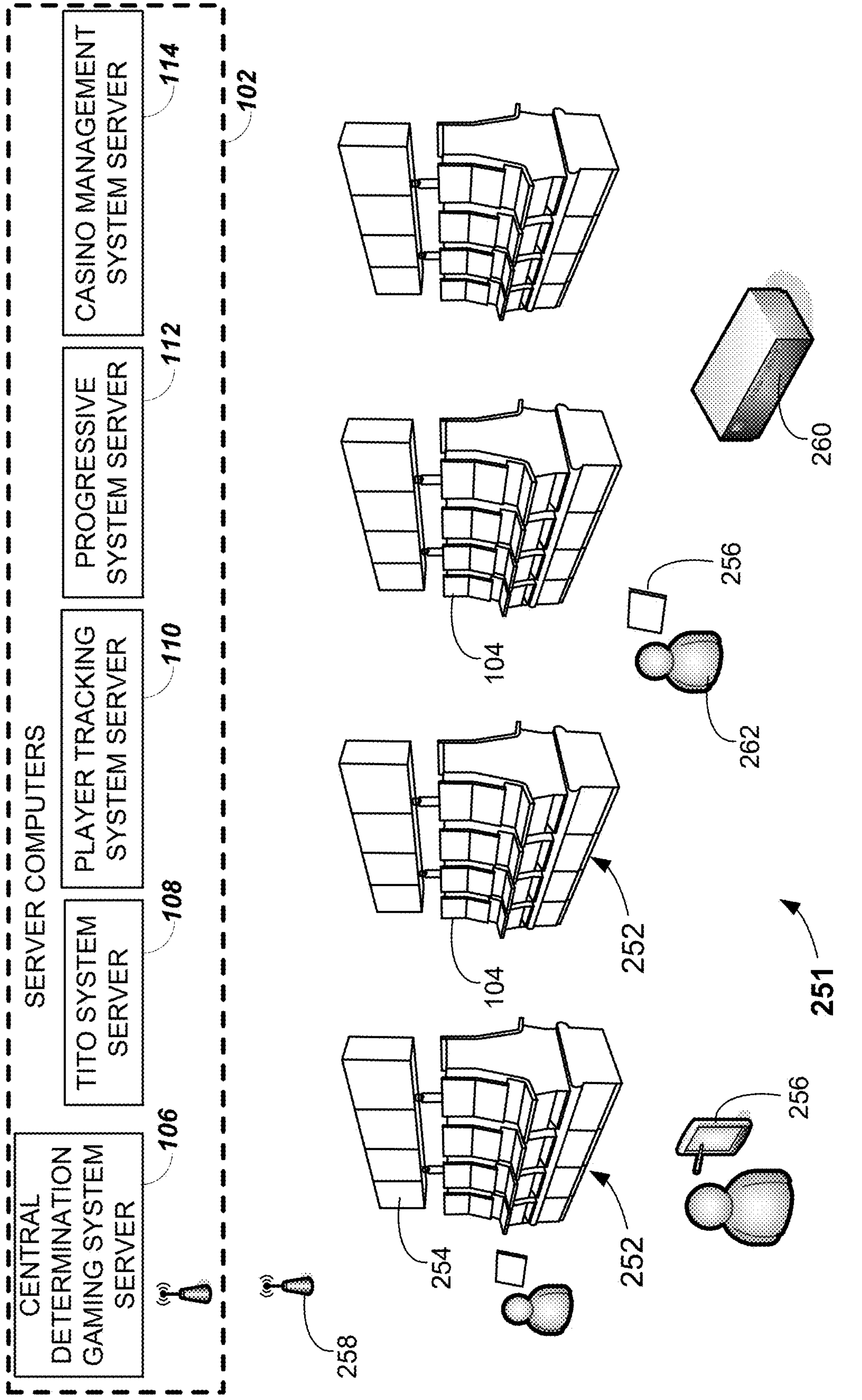
FIG. 2B depicts a casino gaming environment according to one example.

FIG. 2B depicts a casino gaming environment according to one example. In this example, the casino 251 includes banks 252 of EGMs 104. In this example, each bank 252 of EGMs 104 includes a corresponding gaming signage system 254 (also shown in FIG. 2A). According to this implementation, the casino 251 also includes mobile gaming devices 256, which are also configured to present wagering games in this example. The mobile gaming devices 256 may, for example, include tablet devices, cellular phones, smart phones and/or other handheld devices. In this example, the mobile gaming devices 256 are configured for communication with one or more other devices in the casino 251, including but not limited to one or more of the server computers 102, via wireless access points 258.

According to some examples, the mobile gaming devices 256 may be configured for stand-alone determination of game outcomes. However, in some alternative implementations the mobile gaming devices 256 may be configured to receive game outcomes from another device, such as the central determination gaming system server 106, one of the EGMs 104, etc.

Some mobile gaming devices 256 may be configured to accept monetary credits from a credit or debit card, via a wireless interface (e.g., via a wireless payment app), via tickets, via a patron casino account, etc. However, some mobile gaming devices 256 may not be configured to accept monetary credits via a credit or debit card. Some mobile gaming devices 256 may include a ticket reader and/or a ticket printer whereas some mobile gaming devices 256 may not, depending on the particular implementation.

In some implementations, the casino 251 may include one or more kiosks 260 that are configured to facilitate monetary transactions involving the mobile gaming devices 256, which may include cash out and/or cash in transactions. The kiosks 260 may be configured for wired and/or wireless communication with the mobile gaming devices 256. The kiosks 260 may be configured to accept monetary credits from casino patrons 262 and/or to dispense monetary credits to casino patrons 262 via cash, a credit or debit card, via a wireless interface (e.g., via a wireless payment app), via tickets, etc. According to some examples, the kiosks 260 may be configured to accept monetary credits from a casino patron and to provide a corresponding amount of monetary credits to a mobile gaming device 256 for wagering purposes, e.g., via a wireless link such as a near-field communications link. In some such examples, when a casino patron 262 is ready to cash out, the casino patron 262 may select a cash out option provided by a mobile gaming device 256, which may include a real button or a virtual button (e.g., a button provided via a graphical user interface) in some instances. In some such examples, the mobile gaming device 256 may send a "cash out" signal to a kiosk 260 via a wireless link in response to receiving a "cash out" indication from a casino patron. The kiosk 260 may provide monetary credits to the casino patron 262 corresponding to the "cash out" signal, which may be in the form of cash, a credit ticket, a credit transmitted to a financial account corresponding to the casino patron, etc.

In some implementations, a cash-in process and/or a cash-out process may be facilitated by the TITO system server 108. For example, the TITO system server 108 may control, or at least authorize, ticket-in and ticket-out transactions that involve a mobile gaming device 256 and/or a kiosk 260.

Some mobile gaming devices 256 may be configured for receiving and/or transmitting player loyalty information. For example, some mobile gaming devices 256 may be configured for wireless communication with the player tracking system server 110. Some mobile gaming devices 256 may be configured for receiving and/or transmitting player loyalty information via wireless communication with a patron's player loyalty card, a patron's smartphone, etc.

According to some implementations, a mobile gaming device 256 may be configured to provide safeguards that prevent the mobile gaming device 256 from being used by an unauthorized person. For example, some mobile gaming devices 256 may include one or more biometric sensors and may be configured to receive input via the biometric sensor(s) to verify the identity of an authorized patron. Some mobile gaming devices 256 may be configured to function only within a predetermined or configurable area, such as a casino gaming area.

Figure 2C:
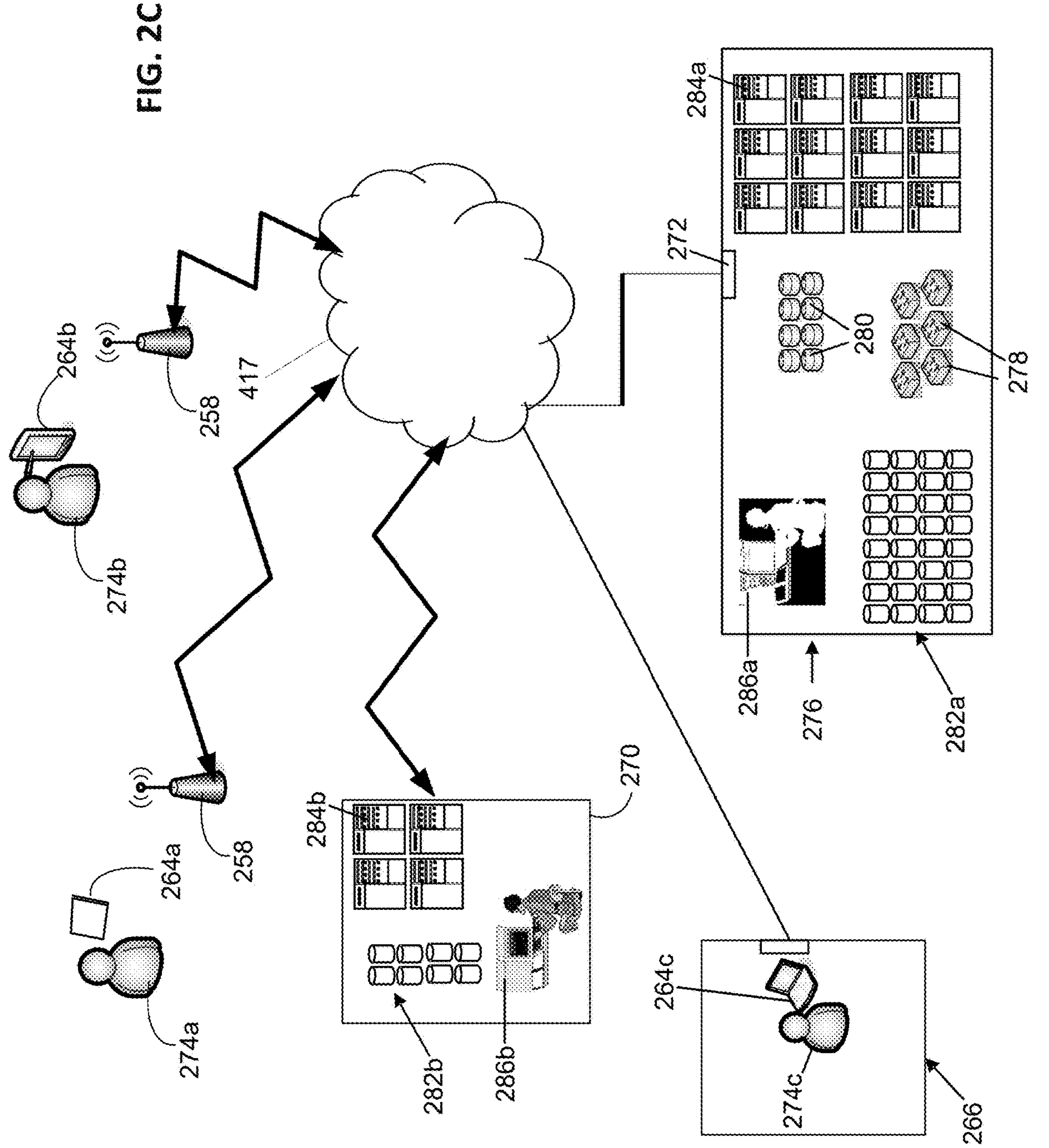
FIG. 2C is a diagram that shows examples of components of a system for providing online gaming according to some aspects of the present disclosure.

FIG. 2C is a diagram that shows examples of components of a system for providing online gaming according to some aspects of the present disclosure. As with other figures presented in this disclosure, the numbers, types and arrangements of gaming devices shown in FIG. 2C are merely shown by way of example. In this example, various gaming devices, including but not limited to end user devices (EUDs) 264*a*, 264*b* and 264*c* are capable of communication via one or more networks 417. The networks 417 may, for example, include one or more cellular telephone networks, the Internet, etc. In this example, the EUDs 264*a* and 264*b* are mobile devices: according to this example the EUD 264*a* is a tablet device and the EUD 264*b* is a smart phone. In this implementation, the EUD 264*c* is a laptop computer that is located within a residence 266 at the time depicted in FIG. 2C. Accordingly, in this example the hardware of EUDs is not specifically configured for online gaming, although each EUD is configured with software for online gaming. For example, each EUD may be configured with a web browser. Other implementations may include other types of EUD, some of which may be specifically configured for online gaming.

In this example, a gaming data center 276 includes various devices that are configured to provide online wagering games via the networks 417. The gaming data center 276 may, for example, be a remote gaming server (RGS) or similar system in some implementations. The gaming data center 276 is capable of communication with the networks 417 via the gateway 272. In this example, switches 278 and routers 280 are configured to provide network connectivity for devices of the gaming data center 276, including storage devices 282*a*, servers 284*a* and one or more workstations 570*a*. The servers 284*a* may, for example, be configured to provide access to a library of games for online game play. In some examples, code for executing at least some of the games may initially be stored on one or more of the storage devices 282*a*. The code may be subsequently loaded onto a server 284*a* after selection by a player via an EUD and communication of that selection from the EUD via the networks 417. The server 284*a* onto which code for the selected game has been loaded may provide the game according to selections made by a player and indicated via the player's EUD. In other examples, code for executing at least some of the games may initially be stored on one or more of the servers 284*a*. Although only one gaming data center 276 is shown in FIG. 2C, some implementations may include multiple gaming data centers 276.

In this example, a financial institution data center 270 is also configured for communication via the networks 417. Here, the financial institution data center 270 includes servers 284*b*, storage devices 282*b*, and one or more workstations 286*b*. According to this example, the financial institution data center 270 is configured to maintain financial accounts, such as checking accounts, savings accounts, loan accounts, etc. In some implementations one or more of the authorized users 274*a*-274*c* may maintain at least one financial account with the financial institution that is serviced via the financial institution data center 270.

According to some implementations, the gaming data center 276 may be configured to provide online wagering games in which money may be won or lost. According to some such implementations, one or more of the servers 284*a* may be configured to monitor player credit balances, which may be expressed in game credits, in currency units, or in any other appropriate manner. In some implementations, the server(s) 284*a* may be configured to obtain financial credits from and/or provide financial credits to one or more financial institutions, according to a player's "cash in" selections, wagering game results and a player's "cash out" instructions. According to some such implementations, the server(s) 284*a* may be configured to electronically credit or debit the account of a player that is maintained by a financial institution, e.g., an account that is maintained via the financial institution data center 270. The server(s) 284*a* may, in some examples, be configured to maintain an audit record of such transactions.

In some alternative implementations, the gaming data center 276 may be configured to provide online wagering games for which credits may not be exchanged for cash or the equivalent. In some such examples, players may purchase game credits for online game play, but may not "cash out" for monetary credit after a gaming session. Moreover, although the financial institution data center 270 and the gaming data center 276 include their own servers and storage devices in this example, in some examples the financial institution data center 270 and/or the gaming data center 276 may use offsite "cloud-based" servers and/or storage devices. In some alternative examples, the financial institution data center 270 and/or the gaming data center 276 may rely entirely on cloud-based servers.

One or more types of devices in the gaming data center 276 (or elsewhere) may be capable of executing middleware, e.g., for data management and/or device communication. Authentication information, player tracking information, etc., including but not limited to information obtained by EUDs 264 and/or other information regarding authorized users of EUDs 264 (including but not limited to the authorized users 274*a*-274*c*), may be stored on storage devices 282 and/or servers 284. Other game-related information and/or software, such as information and/or software relating to leaderboards, players currently playing a game, game themes, game-related promotions, game competitions, etc., also may be stored on storage devices 282 and/or servers 284. In some implementations, some such game-related software may be available as "apps" and may be downloadable (e.g., from the gaming data center 276) by authorized users.

In some examples, authorized users and/or entities (such as representatives of gaming regulatory authorities) may obtain gaming-related information via the gaming data center 276. One or more other devices (such EUDs 264 or devices of the gaming data center 276) may act as intermediaries for such data feeds. Such devices may, for example, be capable of applying data filtering algorithms, executing data summary and/or analysis software, etc. In some implementations, data filtering, summary and/or analysis software may be available as "apps" and downloadable by authorized users.

Figure 3:
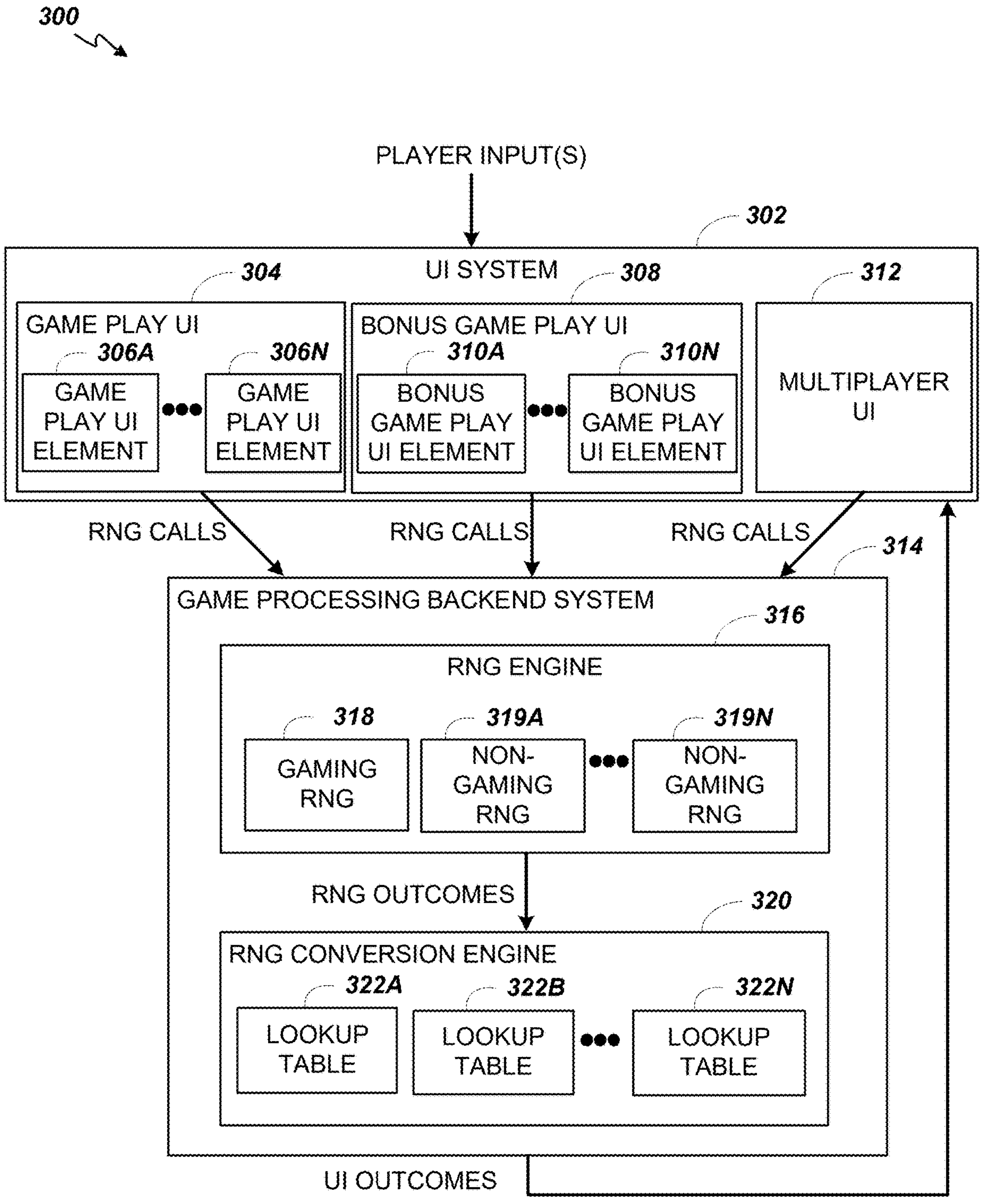
FIG. 3 illustrates, in block diagram form, an implementation of a game processing architecture algorithm that implements a game processing pipeline for the play of a game in accordance with various implementations described herein.

FIG. 3 illustrates, in block diagram form, an implementation of a game processing architecture 300 that implements a game processing pipeline for the play of a game in accordance with various implementations described herein. As shown in FIG. 3, the gaming processing pipeline starts with having a UI system 302 receive one or more player inputs for the game instance. Based on the player input(s), the UI system 302 generates and sends one or more RNG calls to a game processing backend system 314. Game processing backend system 314 then processes the RNG calls with RNG engine 316 to generate one or more RNG outcomes. The RNG outcomes are then sent to the RNG conversion engine 320 to generate one or more game outcomes for the UI system 302 to display to a player. The game processing architecture 300 can implement the game processing pipeline using a gaming device, such as gaming devices 104A-104X and 200 shown in FIGS. 1 and 2, respectively. Alternatively, portions of the gaming processing architecture 300 can implement the game processing pipeline using a gaming device and one or more remote gaming devices, such as central determination gaming system server 106 shown in FIG. 1.

The UI system 302 includes one or more UIs that a player can interact with. The UI system 302 could include one or more game play UIs 304, one or more bonus game play UIs 308, and one or more multiplayer UIs 312, where each UI type includes one or more mechanical UIs and/or graphical UIs (GUIs). In other words, game play UI 304, bonus game play UI 308, and the multiplayer UI 312 may utilize a variety of UI elements, such as mechanical UI elements (e.g., physical "spin" button or mechanical reels) and/or GUI elements (e.g., virtual reels shown on a video display or a virtual button deck) to receive player inputs and/or present game play to a player. Using FIG. 3 as an example, the different UI elements are shown as game play UI elements 306A-306N and bonus game play UI elements 310A-310N.

The game play UI 304 represents a UI that a player typically interfaces with for a base game. During a game instance of a base game, the game play UI elements 306A-306N (e.g., GUI elements depicting one or more virtual reels) are shown and/or made available to a user. In a subsequent game instance, the UI system 302 could transition out of the base game to one or more bonus games. The bonus game play UI 308 represents a UI that utilizes bonus game play UI elements 310A-310N for a player to interact with and/or view during a bonus game. In one or more implementations, at least some of the game play UI element 306A-306N are similar to the bonus game play UI elements

310A-310N. In other implementations, the game play UI element 306A-306N can differ from the bonus game play UI elements 310A-310N.

FIG. 3 also illustrates that UI system 302 could include a multiplayer UI 312 purposed for game play that differs or is separate from the typical base game. For example, multiplayer UI 312 could be set up to receive player inputs and/or presents game play information relating to a tournament mode. When a gaming device transitions from a primary game mode that presents the base game to a tournament mode, a single gaming device is linked and synchronized to other gaming devices to generate a tournament outcome. For example, multiple RNG engines 316 corresponding to each gaming device could be collectively linked to determine a tournament outcome. To enhance a player's gaming experience, tournament mode can modify and synchronize sound, music, reel spin speed, and/or other operations of the gaming devices according to the tournament game play. After tournament game play ends, operators can switch back the gaming device from tournament mode to a primary game mode to present the base game. Although FIG. 3 does not explicitly depict that multiplayer UI 312 includes UI elements, multiplayer UI 312 could also include one or more multiplayer UI elements.

Based on the player inputs, the UI system 302 could generate RNG calls to a game processing backend system 314. As an example, the UI system 302 could use one or more application programming interfaces (APIs) to generate the RNG calls. To process the RNG calls, the RNG engine 316 could utilize gaming RNG 318 and/or non-gaming RNGs 319A-319N. Gaming RNG 318 could corresponds to RNG 212 or hardware RNG 244 shown in FIG. 2A. As previously discussed with reference to FIG. 2A, gaming RNG 318 often performs specialized and non-generic operations that comply with regulatory and/or game requirements. For example, because of regulation requirements, gaming RNG 318 could correspond to RNG 212 by being a cryptographic RNG or pseudorandom number generator (PRNG) (e.g., Fortuna PRNG) that securely produces random numbers for one or more game features. To securely generate random numbers, gaming RNG 318 could collect random data from various sources of entropy, such as from an operating system (OS) and/or a hardware RNG (e.g., hardware RNG 244 shown in FIG. 2A). Alternatively, non-gaming RNGs 319A-319N may not be cryptographically secure and/or be computationally less expensive. Non-gaming RNGs 319A-319N can, thus, be used to generate outcomes for non-gaming purposes. As an example, non-gaming RNGs 319A-319N can generate random numbers for generating random messages that appear on the gaming device.

The RNG conversion engine 320 processes each RNG outcome from RNG engine 316 and converts the RNG outcome to a UI outcome that is feedback to the UI system 302. With reference to FIG. 2A, RNG conversion engine 320 corresponds to RNG conversion engine 210 used for game play. As previously described, RNG conversion engine 320 translates the RNG outcome from the RNG 212 to a game outcome presented to a player. RNG conversion engine 320 utilizes one or more lookup tables 322A-322N to regulate a prize payout amount for each RNG outcome and how often the gaming device pays out the derived prize payout amounts. In one example, the RNG conversion engine 320 could utilize one lookup table to map the RNG outcome to a game outcome displayed to a player and a second lookup table as a pay table for determining the prize payout amount for each game outcome. In this example, the mapping between the RNG outcome and the game outcome controls the frequency in hitting certain prize payout amounts. Different lookup tables could be utilized depending on the different game modes, for example, a base game versus a bonus game.

After generating the UI outcome, the game processing backend system 314 sends the UI outcome to the UI system 302. Examples of UI outcomes are symbols to display on a video reel or reel stops for a mechanical reel. In one example, if the UI outcome is for a base game, the UI system 302 updates one or more game play UI elements 306A-306N, such as symbols, for the game play UI 304. In another example, if the UI outcome is for a bonus game, the UI system could update one or more bonus game play UI elements 310A-310N (e.g., symbols) for the bonus game play UI 308. In response to updating the appropriate UI, the player may subsequently provide additional player inputs to initiate a subsequent game instance that progresses through the game processing pipeline.

As discussed earlier, electronic gaming machines that have dual displays may be difficult to ship or transport from one location to another in an assembled state due to their height. Some such electronic gaming machines may, for example, be more than 8 ft, 9 ft, 10 ft, 11 ft, or 12 ft tall, making it difficult or impossible to ship them in a standard shipping container or standard enclosed trailer and often making it difficult or impossible to move such electronic gaming machines from some portions of a facility, e.g., a casino, to other portions of the facility, e.g., in cases where such movement involves needing to move the electronic gaming machines through a doorway or via an elevator. Electronic gaming machines are typically designed to remain in an upright configuration and are not designed to be shipped or moved in a prone configuration, so tipping the electronic gaming machines over on their sides or front or back is usually not an option.

Discussed below are various implementations of mechanisms, as discussed earlier, that may be configured to allow both display panels of a dual-display electronic gaming machine, e.g., a main display panel and a secondary display panel positioned above the main display panel, to be positioned such that their display surfaces face in the same, or generally the same, direction and form a relatively continuous aggregate display area. Such mechanisms may also be configured to allow the secondary display panel to be pitched downward such that the secondary display surface of the secondary display panel faces towards the main display surface of the main display panel. In doing so, the secondary display panel may be rotated about a first axis positioned near where the main display panel and the secondary display panel met when forming the relatively contiguous display area and flipped upside down, thereby decreasing the height of the electronic gaming machine by approximately the height of the secondary display panel (when in its deployed state).

Figure 4:
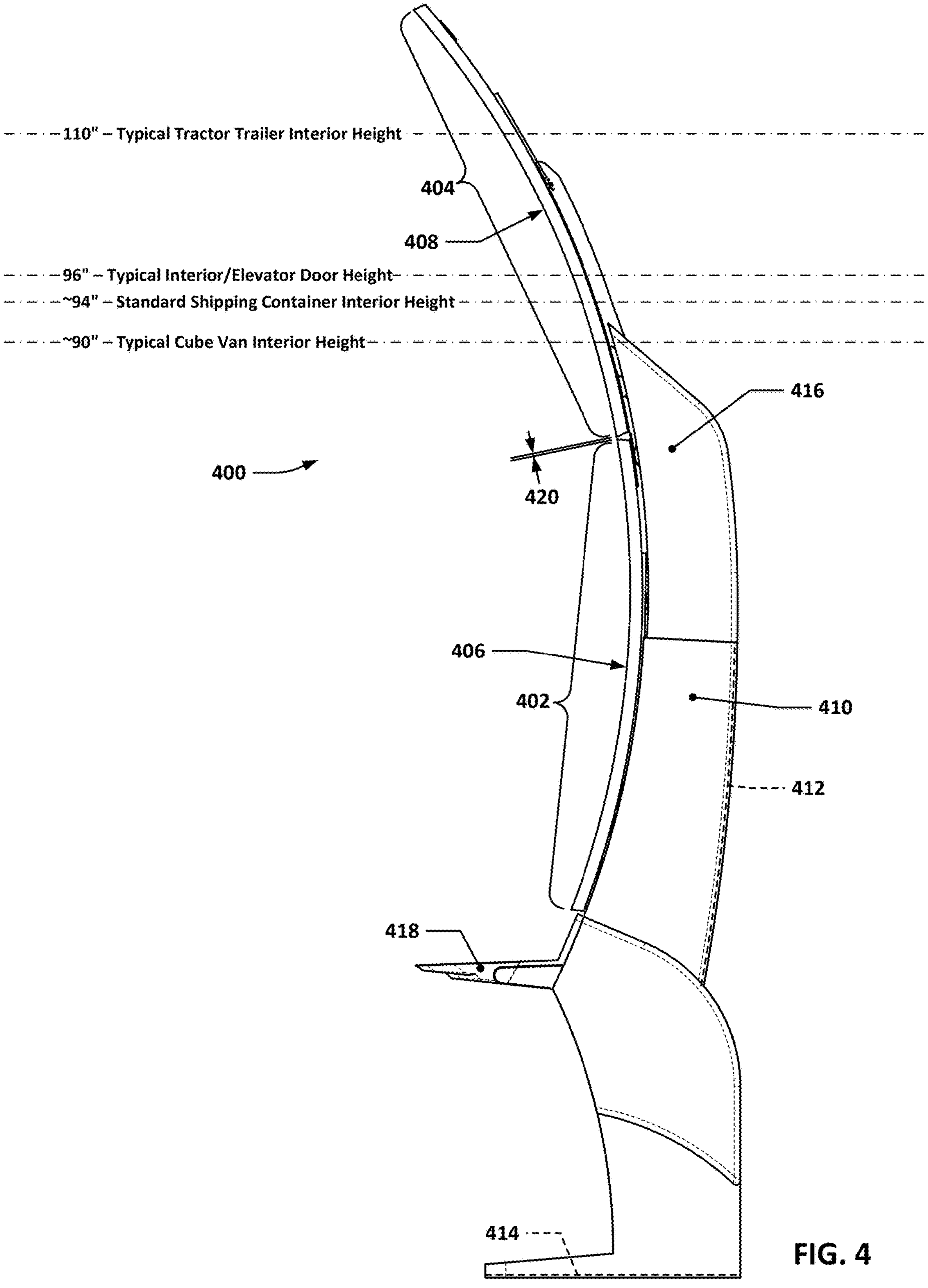
FIG. 4 depicts an example of a dual-display electronic gaming machine in its fully deployed/in-use state.

FIG. 4 depicts an example of a dual-display electronic gaming machine in its fully deployed/in-use state. As can be seen, the electronic gaming machine 400 includes a main display panel 402 and a secondary display panel 404 that are arranged in a vertically stacked configuration, e.g., such that a main display surface 406 of the main display panel 402 and a secondary display surface 408 of the secondary display panel 404 form a generally continuous display surface, in effect acting like one large display panel. A gap 420 may be present between the main display surface 406 and the secondary display surface 408, although such a gap may be quite small, e.g., on the order of less than 1% of the height of the main display device.

The electronic gaming machine 400 may also include a cabinet 410 that may enclose various systems and structures of the electronic gaming machine 400, e.g., power supplies, electronics components, bill acceptors, display panel support systems, speakers, etc. The cabinet 410 in this example has a rear wall 412 and a base 414. The base 414 may be designed to rest on the floor of a casino or other establishment. The electronic gaming machine 400 in this example also includes a cowling 416 that may be separable from the cabinet 410 and may be used to cover portions of the electronic gaming machine 400 that may be used to support the secondary display panel 404, thereby presenting an aesthetically pleasing outer contour to the electronic gaming machine 400 while also acting to prevent or discourage debris from entering the cabinet 410 through the top of the cabinet 410.

The electronic gaming machine 400 in this example also includes a button deck 418. The button deck 418 may provide various user-selectable controls, e.g., buttons, touch-screen interfaces, etc., that may allow a user to interact with, and play, a game offered by the electronic gaming machine 400. In this example, the button deck 418 is a "virtual button deck" that does not include physical buttons and instead provides for user input via a touch-screen interface. The button deck 418 may, in other implementations, include one or more physical/electromechanical buttons.

FIG. 4 also depicts, for comparison, the elevations of a typical interior door or elevator door (96"), a typical interior height of a standard ISO shipping container (~94"), a typical "cube van" (~90"), and the interior ceiling height of a typical tractor trailer (110"). As can be seen, the example electronic gaming machine 400 is, when in its fully deployed/in-use state, taller than all four of these elevations.

The electronic gaming machine 400, however, is able to be placed into a stowed or shipping configuration due to its incorporation of various features that permit the secondary display panel 404 to be folded downward such that the secondary display surface 408 faces towards the main display surface 406 of the main display panel 402. Such a stowed or shipping configuration for the electronic gaming machine 400 is shown in FIG. 5.

Figure 5:
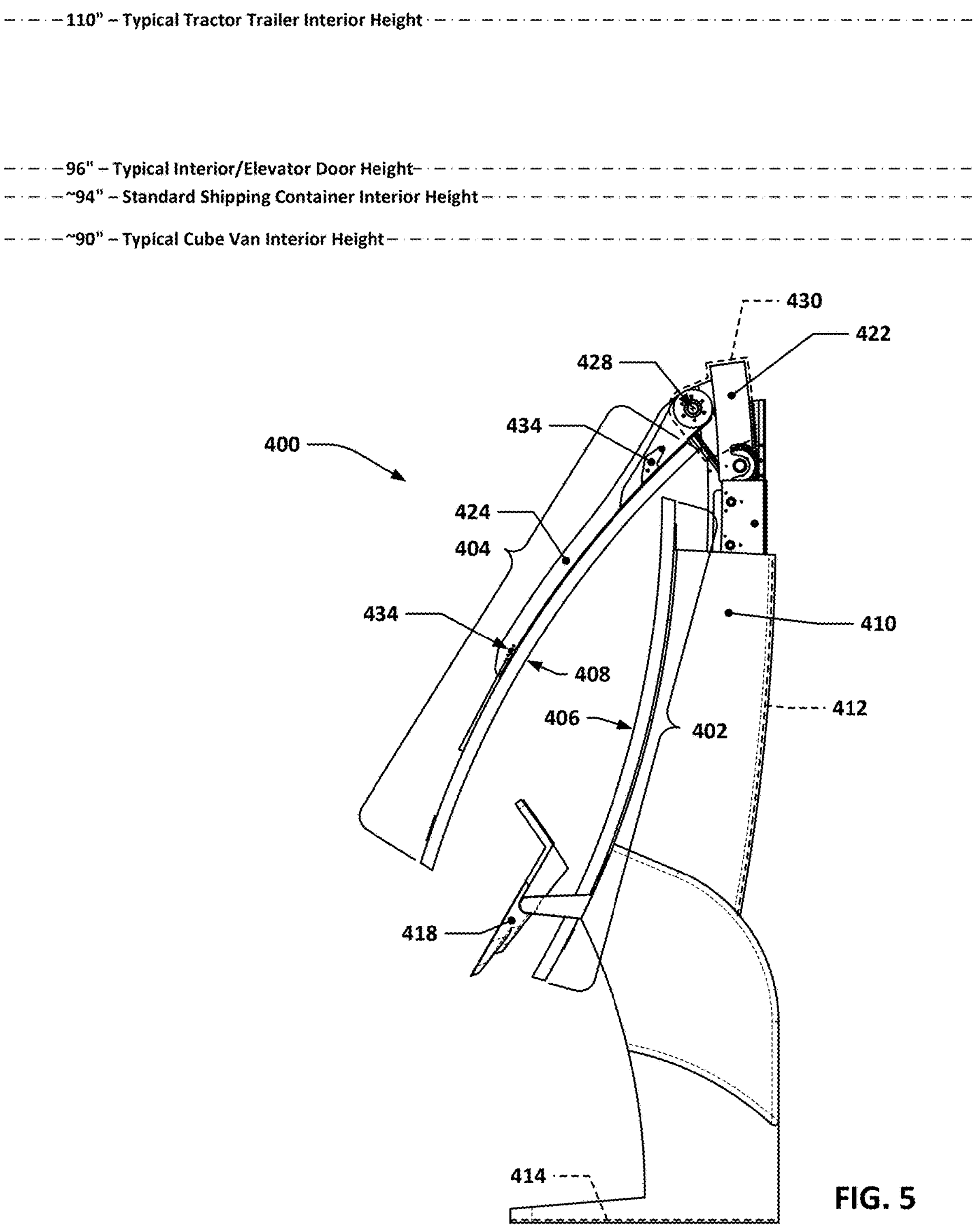
FIG. 5 depicts the example dual-display electronic gaming machine of FIG. 4 in a stowed or shipping configuration.

As can be seen from FIG. 5, the cowling 416 has been removed (it is not shown, but may be stored, for example, in the area under the button deck 418 for shipment, if desired), thereby exposing a support structure 422 with a first portion 430 that supports a first mount 424. The first mount 424 may include one or more first mounting features 434 that may connect with features on the secondary display panel 404. The first mounting features 434 may be latches, hooks, screws, or other features that are positioned and adapted to mechanically interface with corresponding features on the secondary display panel 404 in order to secure the secondary display panel 404 to the first mount 424.

Figure 6:
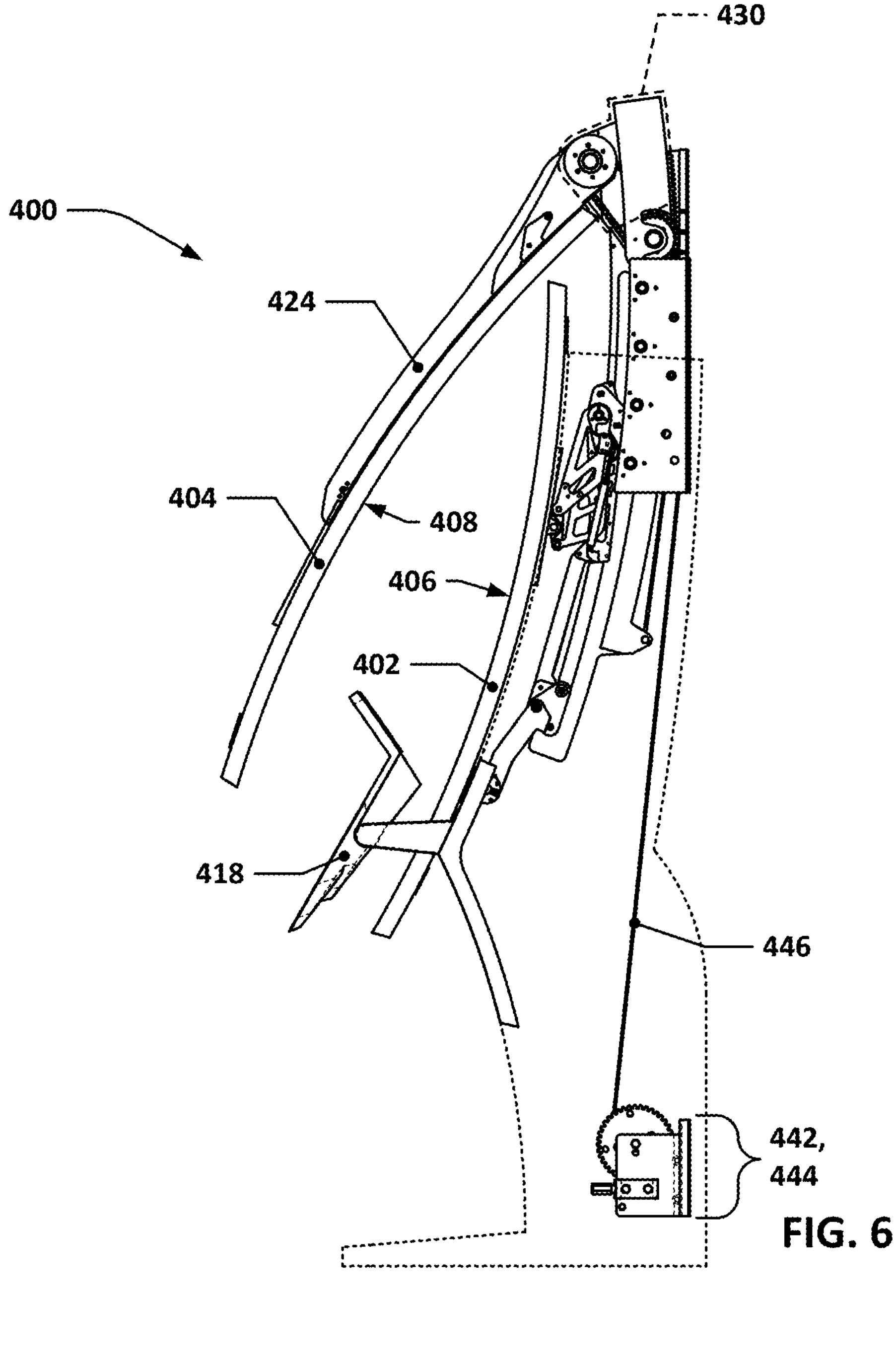
FIG. 6 depicts the example electronic gaming machine of FIG. 5 but with the cabinet of the electronic gaming machine shown as a dotted outline, thereby exposing to view more of the internal structures of the electronic gaming machine.
Figure 7:
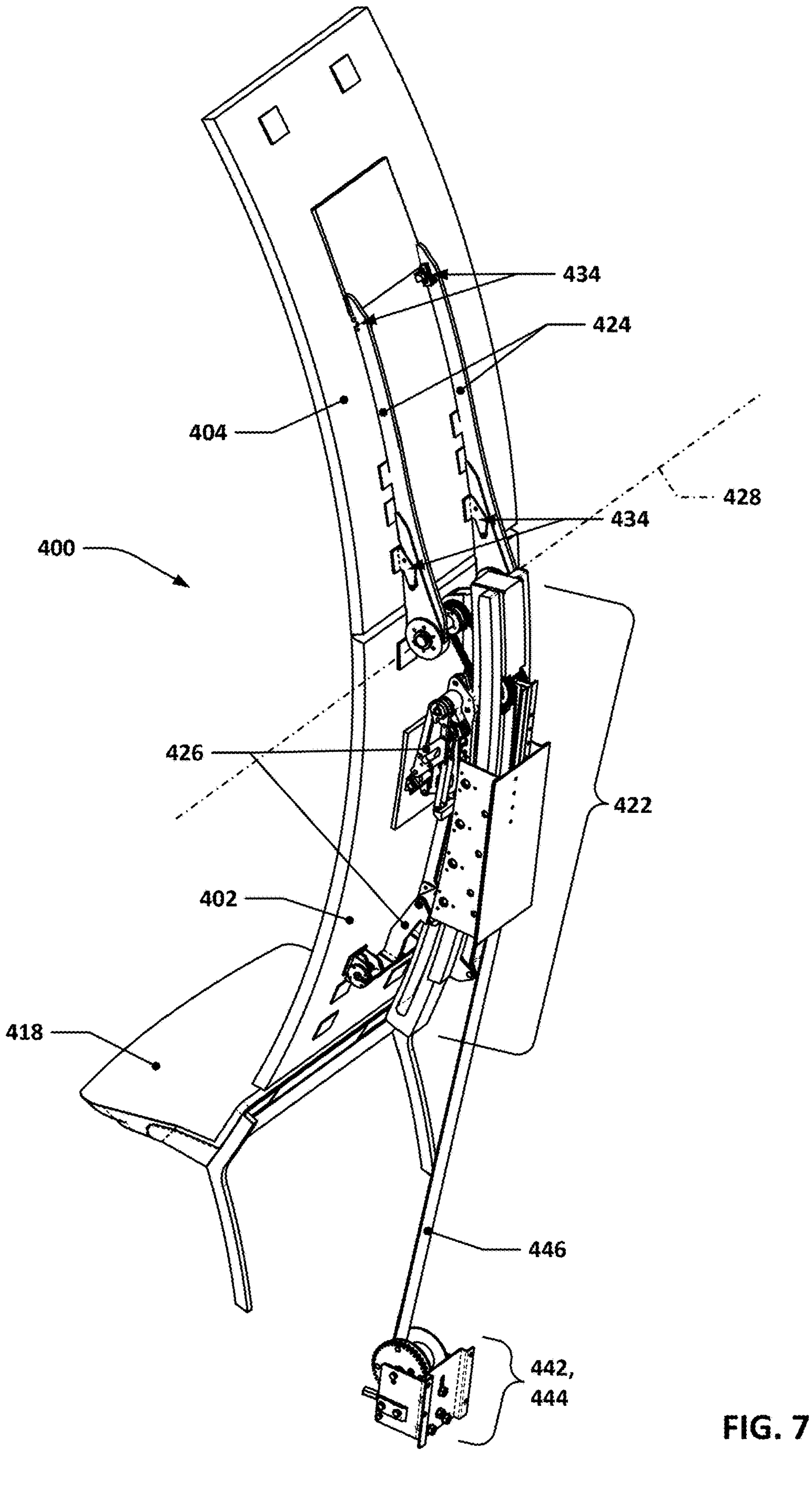
FIGS. 7 through 10 depict back perspective views of the electronic gaming machine of FIG. 4 without the cabinet or cowling visible.

It can be additionally seen that first mount 424 is rotatably connected with the first portion 430 of the support structure 422 such that the first mount 424 (and the secondary display panel 404 connected thereto and supported thereby) is able to rotate about a first axis 428 to transition between a first rotational position relative to the first portion 430 of the support structure 422 (as shown in FIG. 6) to a second rotational position relative to the first portion of the support structure 422 (as shown in FIG. 4) and such that the secondary display surface 408 of the secondary display panel 404 is pointing towards the main display surface 406 of the main display panel 402 when in the first rotational position. Put another way, the second mount 426 may be positioned in between the second portion 432 of the support structure 422 and at least a portion of the first mount 424 when the first mount 424 is in the first rotational position relative to the first portion 430 of the support structure 422. Such downward rotation of the first mount 424 has the effect of shortening the height of the electronic gaming machine 400 by a significant amount—giving it about a foot or more of vertical clearance with respect to the various elevations indicated in FIGS. 4 and 5.

Various details of this example mechanism are discussed below, although it will be appreciated that various implementations may only include a subset of such features or may be configured somewhat differently. For example, the example electronic gaming machine 400 features a main display panel 402 and a secondary display panel 404 that are both curved, but the mechanisms discussed herein may also be used in implementations in which one or both display panels is flat.

FIG. 6 depicts the electronic gaming machine 400 of FIG. 5 but with the cabinet 410 shown as a dotted outline, thereby exposing to view more of the support structure 422 and various other systems previously obscured by the cabinet 410. As can be seen, the support structure 422 also includes a second portion 432 to which a second mount 426 is connected. The support structure 422 supports the second mount 426 which, in turn, supports the main display panel 402.

Also visible in FIG. 6 is an actuator 442 which, in this example, is a winch mechanism 444 with a strap 446 that may be used to actuate the mechanism that supports the main display panel 402 and the secondary display panel 404. The actuator 442, for example, may be any mechanism that may be actuated responsive to one or more inputs, e.g., application of torque, electrical power, etc., in order to cause the actuator to move the movable portion 440 of the support structure 422 relative to the stationary portion 438 of the support structure 422. It will be understood that while the present example uses a winch mechanism 444 as the actuator 442, other implementations may use a linear actuator, gear/chain drive, etc. to similar effect. Moreover, the strap 446 may, in some instances, be a chain, cable, or other flexible member that may work in a similar manner.

Figure 8:
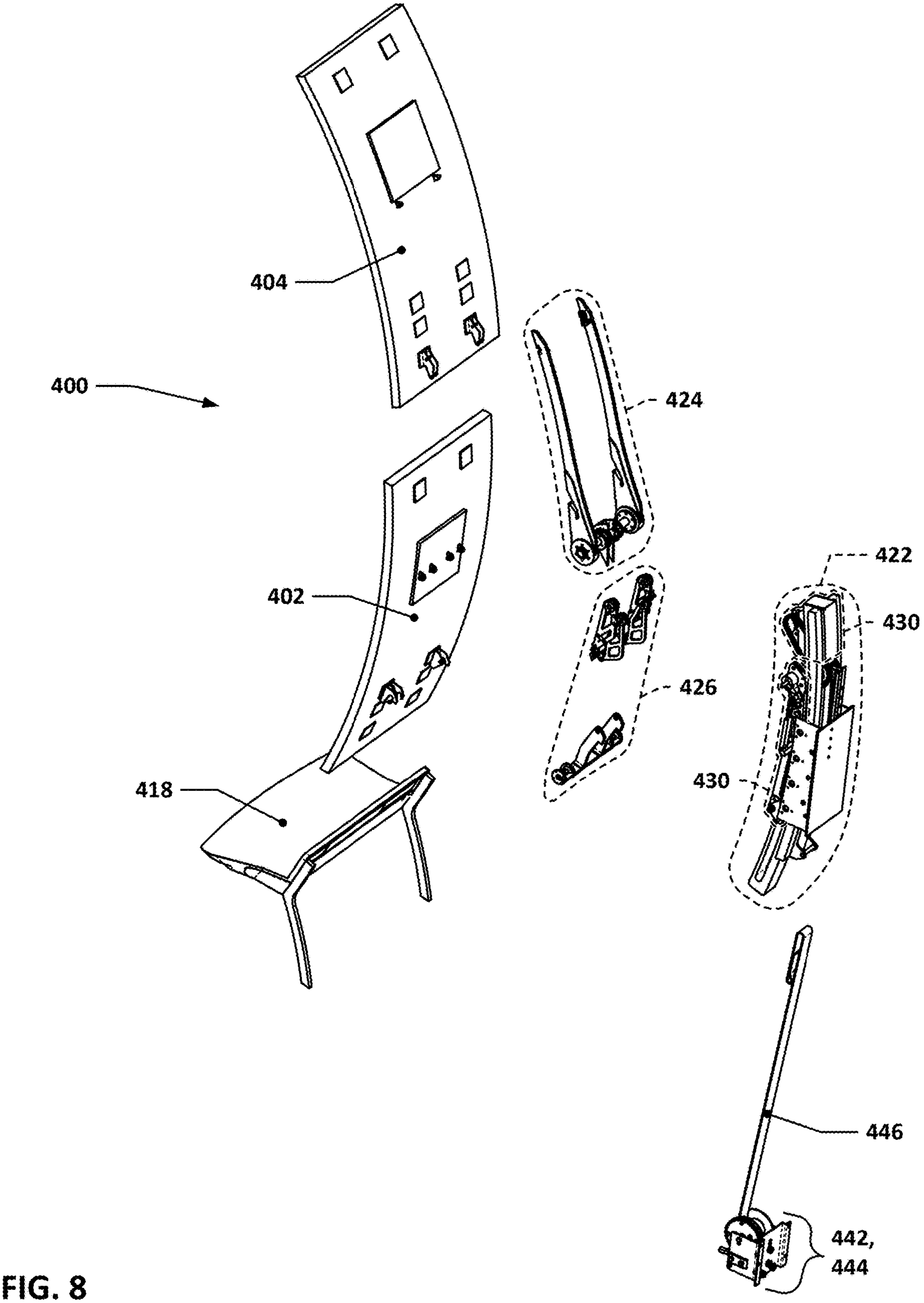
Figure 9:
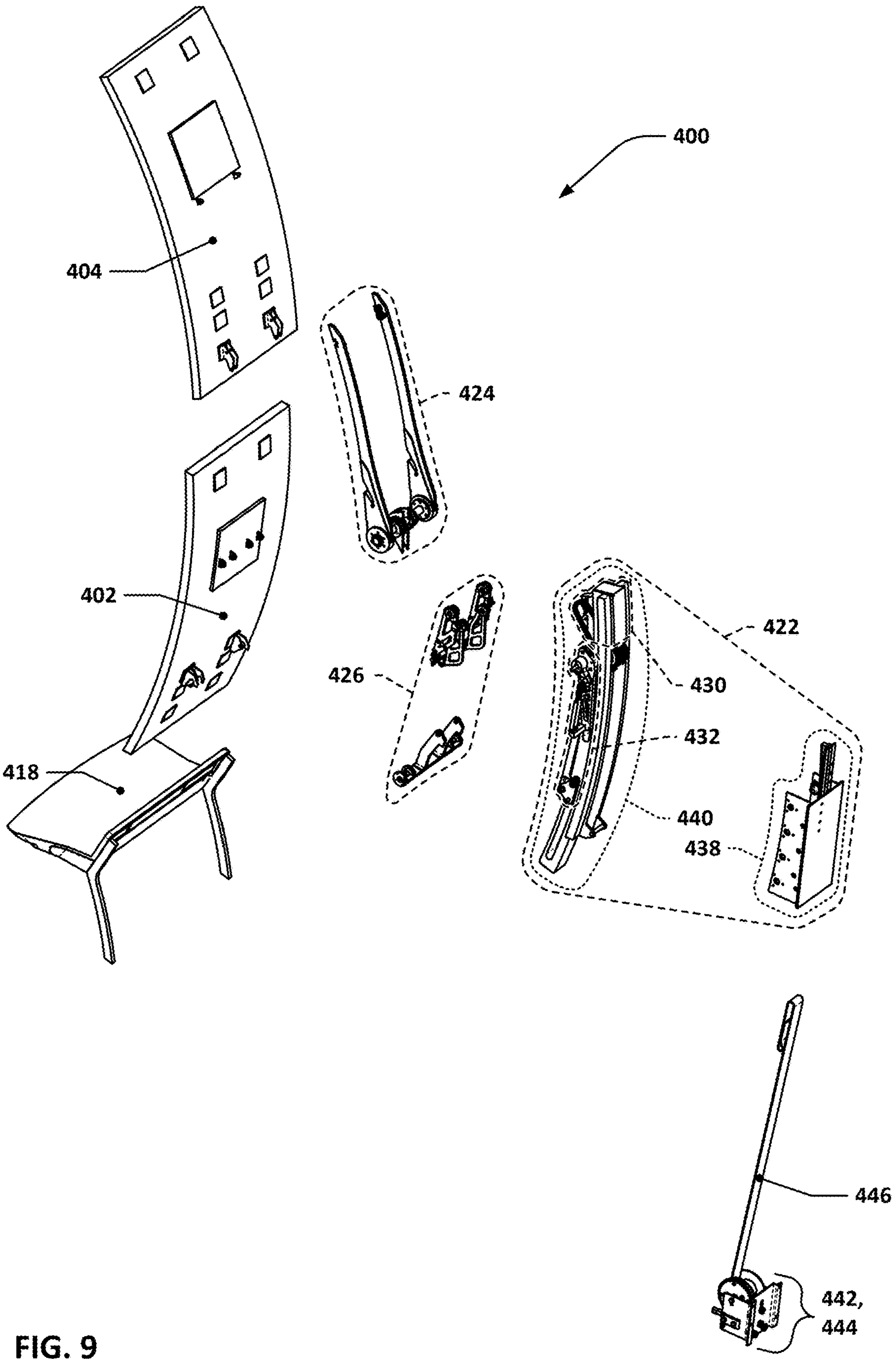
Figure 10:
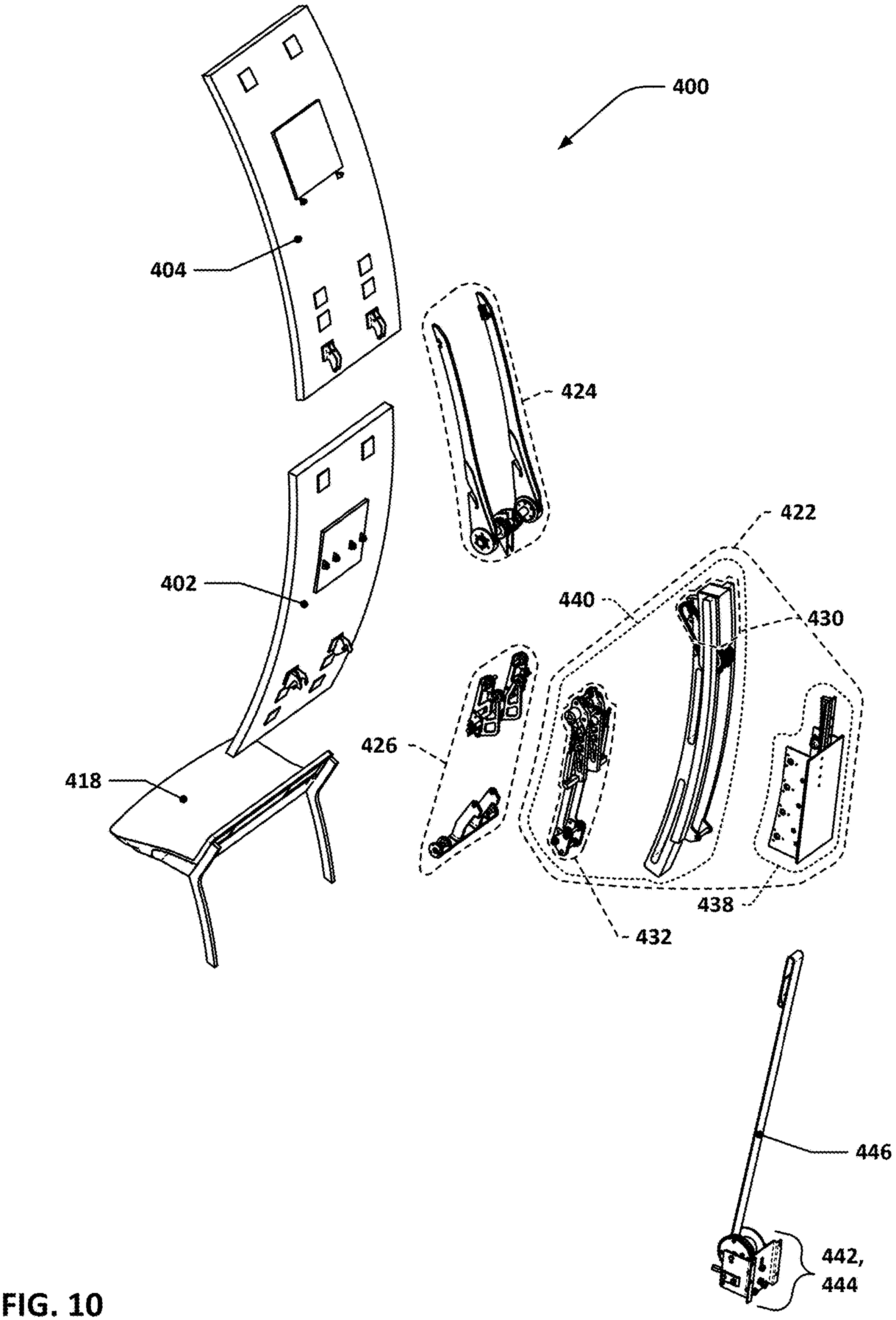

FIGS. 7 through 10 depict back perspective views of the electronic gaming machine 400 without the cabinet 410 or cowling 416 visible. FIGS. 8 through 10 depict various exploded views of FIG. 7. As can be seen, the support structure 422 extends along the rear wall 412 of the cabinet 410 (not shown, but see FIG. 6) and provides a spine or backbone of the electronic gaming machine 400 that supports the main display panel 402 and the secondary display panel 404. As mentioned above, the first mount 424 may be connected with a first portion 430 of the support structure 422, while the second mount 426 may be connected with a second portion 432 of the support structure 422. To make it easier to discern the first mount 424 and the second mount 426 from the support structure, FIG. 8 shows the electronic gaming machine 400 in a partially exploded view in which the first mount 424 and the second mount 426 are shown removed from the support structure 422. The main display panel 402 and the secondary display panel 404 are also shown removed from the second mount 426 and the first mount 424, respectively. As discussed earlier, the secondary display panel 404 may be mounted to the first mount 424 via one or more first mounting features 434. Similarly, the main display panel 402 may be mounted to the second mount 426 via one or more second mounting features 436, which may, like the one or more first mounting features 434, be latches, hooks, screws, or other features that are positioned and adapted to mechanically interface with corresponding features on the main display panel 402 in order to secure the main display panel 402 to the second mount 426.

The main display panel 402, the secondary display panel 404, and the button deck 418 are also shown with increased vertical separation to make it clearer as to which is which. Finally, the actuator 442/winch mechanism 444 are shown disengaged from the support structure 422.

As can be seen, the second mount 426 may, in some cases, include multiple subassemblies (in this case, two) that may be disconnected from one another. Such subassemblies may, however, be connected with one another via other components when fully assembled. For example, the two separate subassemblies of the second mount 426 are, when the apparatus is assembled, connected with main display panel 402 and the second portion 432 of the support structure 422, thereby supporting the main display panel 402 with respect to the second portion 432 of the support structure 422.

The various assemblies shown in FIG. 8 may be further subdivided, in some instances. For example, the support structure 422 may, in some instances (such as that depicted) include a stationary portion 438 and a movable portion 440. FIG. 9 depicts an exploded view in which the support structure 422 has been further exploded to show the movable portion 440 and the stationary portion 438 separated from one another. The stationary portion 438 of the support structure 422 may, for example, be fixedly mounted with respect to the cabinet 410 (or relative to an internal support framework or chassis of the electronic gaming machine 400). The movable portion 440 of the support structure 422, in turn, may be movable relative to the stationary portion 438, thereby allowing the first portion 430 and the second portion 432, which may be part of the movable portion 440 of the support structure 422—as well as the first mount 424 and the second mount 426 (and the display panels supported thereby)—to be moved along a first path and between a stowed position and a deployed position relative to the stationary portion 438. This may allow, for example, the first axis 428 to be moved between two different elevations, thereby providing the potential for decreasing or raising the height of the electronic gaming machine 400 when in the shipping/stowed configuration or the deployed configuration more than could be accomplished with rotation or pitching of the first mount 424 and the secondary display panel 404 about the first axis 428 alone.

Having a support structure 422 with a movable portion 440 and a stationary portion 438 may also provide the opportunity to kinematically couple or link the rotation of the first mount 424 about the first axis 428 with movement of the movable portion 440 of the support structure 422 relative to the stationary portion 438 of the support structure 422 along the first path. For example, the first mount 424 may be kinematically linked with the stationary portion 438 and the movable portion 440 such that when the movable portion 440 moves from the stowed position to the deployed position relative to the stationary portion 438, the first mount 424 moves from the first rotational position to the second rotational position relative to the first portion 430 of the support structure 422.

It will be understood, however, that support structures 422 without movable portions 440, i.e., where the entire support structure 422 is stationary, are also within the scope of this disclosure. Such alternate implementations may not have quite the same range of height variation than can be achieved with systems that have the ability to move the first axis 428 vertically but are still able to provide for a significant reduction in height of the electronic gaming machine 400 when transitioned into the stowed or shipping configuration.

In some implementations, the second portion 432 of the support structure may be movable relative to the first portion 430, i.e., a subassembly of a larger assembly. The example of FIGS. 4 through 9 provides an example of such an implementation. For example, as shown in FIG. 10, the second portion 432 of the support structure 422 is a separate mechanism that is configured to translate along a path defined by guides of the support structure 422 that are fixed with respect to the first portion 430.

Figure 11:
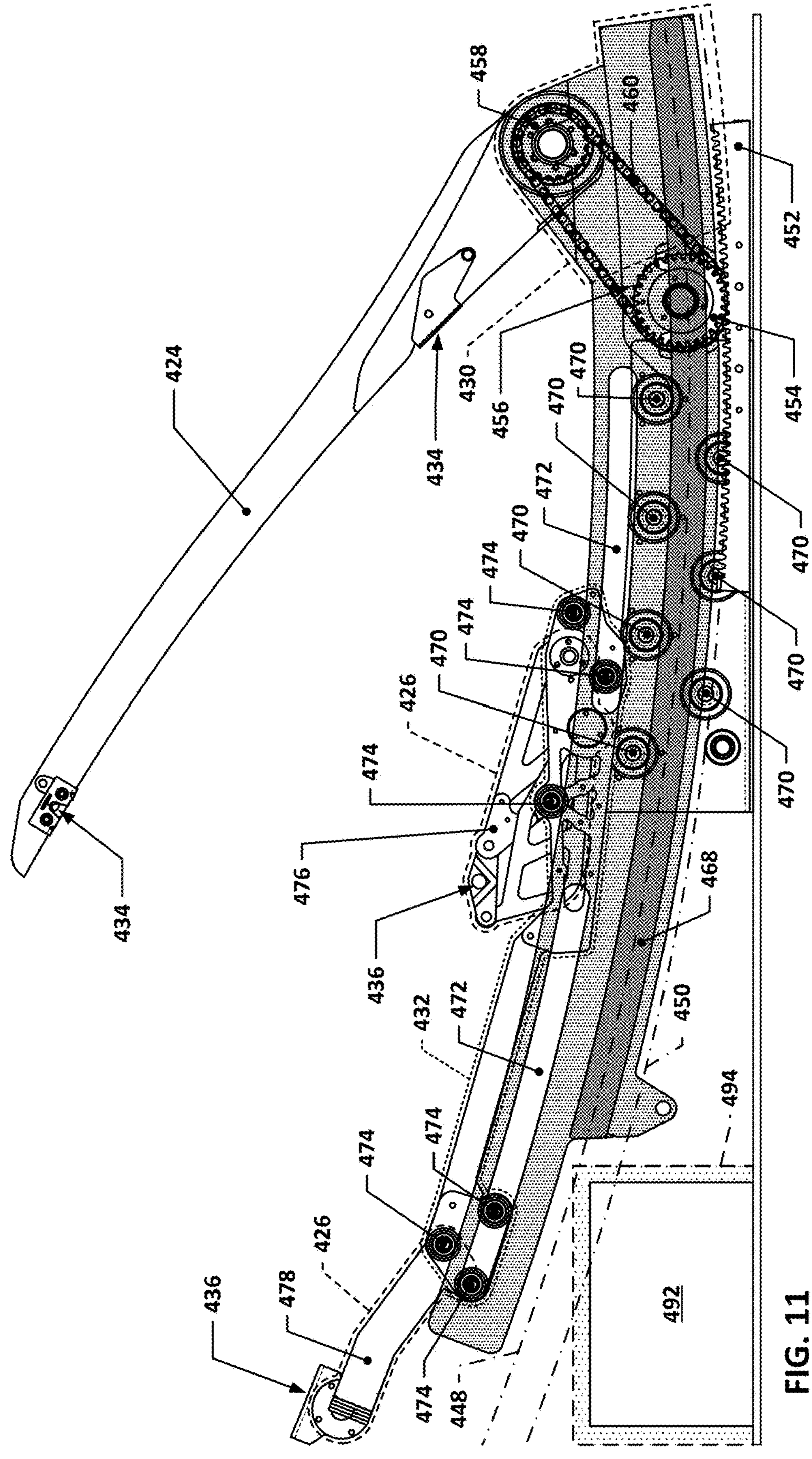
FIG. 11 depicts a sub-portion of the mechanism depicted in FIGS. 7 through 10 in side view with various elements hidden to better illustrate the workings of the example mechanism of the electronic gaming machine of FIG. 4.

A sub-portion of the mechanism depicted in FIGS. 7 through 10 is depicted in FIG. 11 in side view with various elements hidden to better illustrate the workings of the example mechanism of the electronic gaming machine 400. As can be seen, support structure 422 includes a rack-and-pinion, with the stationary portion 438 of the support structure 422 having a rack 452 while the movable portion 440 of the support structure 422 has a pinion 454 that is engaged with the rack 452.

The pinion 454, in this case, is kinematically linked to the first mount 424 via a drive sprocket 456 and a driven sprocket 458 that are each engaged with a multi-link chain 460. The drive sprocket 456 is engaged with the pinion 454 such that when the pinion 454 is rotated relative to the first portion 430 of the support structure, the drive sprocket 456 rotates in tandem with the pinion 454. Similarly, the first mount 424 is engaged with the driven sprocket 458 such that when the driven sprocket 458 is rotated relative to the first portion 430 of the support structure 422, the first mount 424 rotates in tandem with the driven sprocket 458. The chain 460 may be engaged with, and span between, both the drive sprocket 456 and the driven sprocket 458 such that the two sprockets turn in unison. If desired, different size sprockets may be used in each location to change the gearing of the mechanism, e.g., increasing or decreasing the amount of rotation of the first mount 424 responsive to rotation of the pinion 454.

It will be understood that other kinematic linkages may be used as well, including gear trains (e.g., if a train of gears and shafts were used to transfer rotational motion from the pinion 454 to the first mount 424), belt drives (in which the sprockets may be replaced with pulleys and the chain 460 replaced with a belt, such as a timing belt or a V-belt), and linkage-driven kinematic systems, such as crank arms with connecting rods or links.

In the depicted example, the mechanism is designed to work with display panels that are curved and is engineered such that various moving parts of the mechanism move along paths that are concentric with each other and, in some cases, with the center points of a radius of curvature of the display panels.

For example, the movable portion 440 of the support structure 422 is configured to translate along a first path 448 and in between a stowed position and a deployed position. In FIG. 11, the movable portion 440 of the support structure 422 is in the stowed position. In this example, the kinematic linkage between the first mount 424 and the pinion 454 has caused the first mount 424 to pivot downward towards the base 414 of the cabinet 410 responsive to the movement of the movable portion 440 towards the base 414. Such movement causes the pinion 454, which is translationally fixed (but not rotationally fixed) in place relative to the first portion 430 and which has gear teeth that are engaged with gear teeth of the rack 452, to rotate relative to the movable portion 440 of the support structure 422 responsive to movement of the movable portion 440 of the support structure 422 relative to the stationary portion 438 of the support structure 422 and the rack 452 that is fixed in place relative to the stationary portion 438 of the support structure 422.

It will be noted that the teeth of the rack 452, in this example, are arranged along a second path 450 that is concentric with the first path 448, e.g., to within ±1 inch. The first path 448 and the second path 450 may, for example, be arcuate and may have radii that are greater than or equal to 70 inches in some implementations (e.g., larger in radius than a curvature radius of the display panels supported thereby, assuming such display panels have arcuate display surfaces).

Additionally, the movable portion 440 of the support structure 422 includes first guides 468 that may engage with first guide engagement features 470 located on the stationary portion 438 of the support structure 422 so as to guide the movable portion 440 of the support structure 422 along the first path 448. The first guide engagement features 470 may, as shown, be rollers or bearings (or glides, pins, etc. that may engage with the first guides 468). It will be recognized that the positioning of the first guides 468 and the first guide engagement features 470 may, in other implementations, be swapped, with the first guides 468 being located on the stationary portion 438 of the support structure 422 and the first guide engagement features 470 being located in the movable portion 440 of the support structure 422.

As noted above, various parts of the mechanism may be constrained to move along various paths. In some implementations, e.g., some implementations such as that pictured in the figures discussed above, such movement may be constrained to follow a curved or arcuate path. In the depicted example, the movable portion 440 of the support structure 422 has arcuate first guides 468 that constrain the movement of the movable portion 440 of the support structure 422 to the first path 448. This causes the movable portion 440 of the support structure 422 to avoid moving through a region 494 adjacent to the rear wall 412 of the cabinet 410, located between the base 414 of the cabinet 410, and in between the movable portion 440 of the support structure 422 and the rear wall 412 of the cabinet 410 when moving between the deployed position and the stowed position. This allows equipment, such as a gaming controller 492 to reside in the region 494 without colliding with the movable portion 440 of the support structure 422. In implementations in which the gaming controller 492 (or other equipment) is not positioned in such a location, the motion of the movable portion 440 of the support structure 422 relative to the stationary portion 438 of the support structure 422 may instead be constrained to linear (instead of curvilinear) motion, e.g., the rack 452 may have teeth arranged along a straight second path 450 and the first guides 468 may be straight instead of curved.

As noted earlier, the second portion 432 of the support structure 422 of some implementations may be movable relative to the first portion 430 of the support structure 422. FIG. 11 illustrates such an arrangement. For example, the movable portion 440 of the support structure 422 includes second guides 472 that may interface with second guide engagement features 474 on the second portion 432 of the support structure 422, thereby allowing the second portion 432 of the support structure 422 to be able to slide or translate along a path, e.g., a curved path concentric with the first path 448 and/or the second path 450. In other implementations, such movable second portions 432 of the support structure 422 may be constrained to move along a straight path.

In this example, the path that the second portion 432 is constrained to move along is arcuate and concentric with the curvature of the main display panel 402, thereby causing the main display surface 406 to be co-radial with the same cylindrical reference surface in either a first configuration (for example, when the second portion 432 is displaced to its limit of movement relative to the first portion 430, e.g., the position shown in FIG. 11) or a second configuration, e.g., as shown in FIG. 11. In other words, such an arrangement keeps the main display panel 402 within an annular zone that is generally as thick (radially) as the thickness of the main display panel 402. As will be seen later, this may allow for more compact stowed configurations for the electronic gaming machine 400.

FIGS. 12 through 19 depict the EGM 400 of FIGS. 5 and 6 in various stages of transition from the stowed configuration shown in FIG. 6 to the deployed configuration shown in FIG. 4.

As can be seen in FIG. 6, when in the stowed configuration, the button deck 418, which may be attached to the cabinet 410 via a hinged mount, has been tilted or pitched forward, thereby creating a gap or opening in between the underside of the button deck 418 and the cabinet 410. The main display panel 402, in this case, has also been slid downward from its deployed height such that the bottom end of the main display panel 402 extends into the gap between the underside of the button deck 418 and the cabinet 410. Finally, the first mount 424 has been rotated downward relative to the support structure 422 and into the first rotational position such that the secondary display panel 404 attached thereto is upside down and has its secondary display surface 408 facing towards the main display surface 406 of the main display panel 402.

Figure 12:
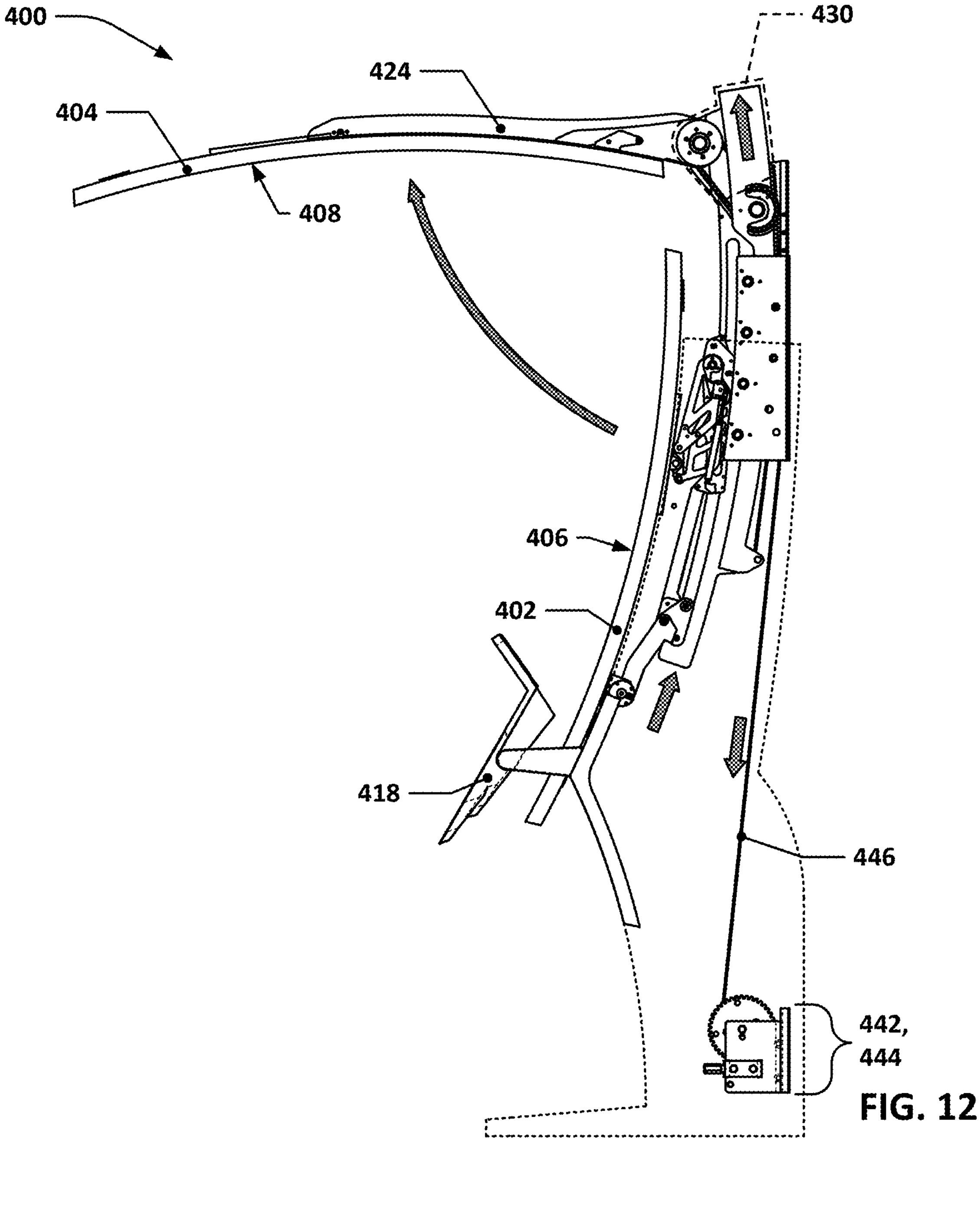
FIGS. 12 through 19 depict the EGM 400 of FIGS. 5 and 6 in various stages of transition from the stowed configuration shown in FIG. 6 to the deployed configuration shown in FIG. 4.

In FIG. 12, the electronic gaming machine 400 has been caused to start transitioning from the stowed configuration shown in FIG. 6 to the deployed configuration of FIG. 4. For example, the transition may be initiated by coupling the winch mechanism 444 to a cordless drill or other rotational power source to drive the winch mechanism 444 and draw the strap 446 into the winch mechanism 444. The free end of the strap 446 may, for example, be looped over a pulley or idler in the stationary portion 438 of the support structure 422 to reverse direction before being connected with a pin, clevis, or other feature on the movable portion 440 of the support structure 422, such that when the strap 446 is placed under tension, the tensile force exerts an upward force on the movable portion 440 of the support structure 422, thereby causing it to travel upwards from its position when the electronic gaming machine 400 is in the stowed configuration.

As the movable portion 440 of the support structure 422 moves upward, the pinion 454 on the movable portion 440 of the support structure 422 engages with the rack 452 on the stationary portion 438 of the support structure 422, thereby causing the pinion 454 to rotate relative to the movable portion 440 of the support structure 422. This rotational movement is then transferred, via the drive sprocket 456, chain 460, and the driven sprocket 458, to the first mount 424, causing the first mount 424 to similarly rotate about the first axis 428. In FIG. 12, the first mount 424 has rotated about 45° from its position in FIG. 6.

Figure 13:
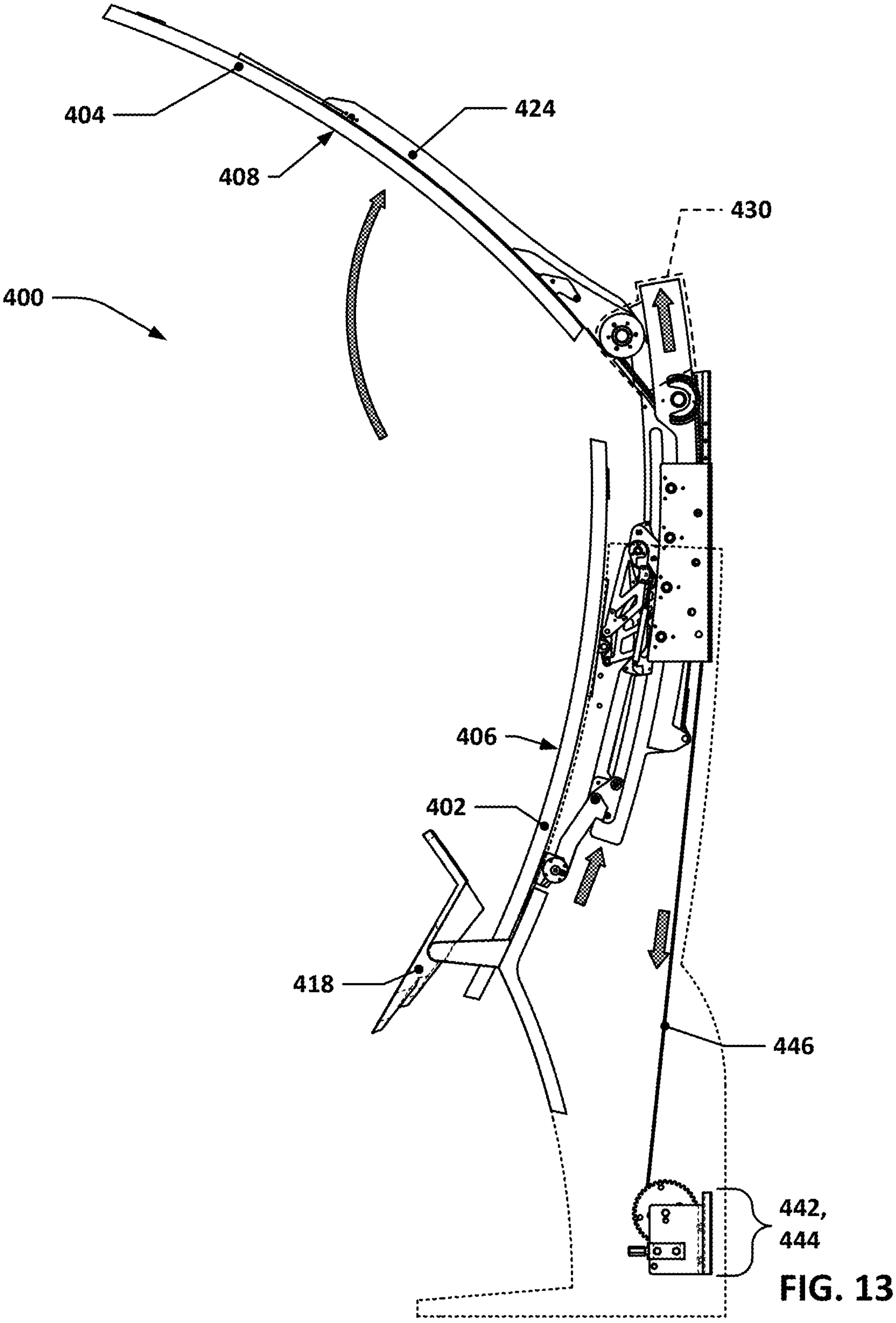
Figure 14:
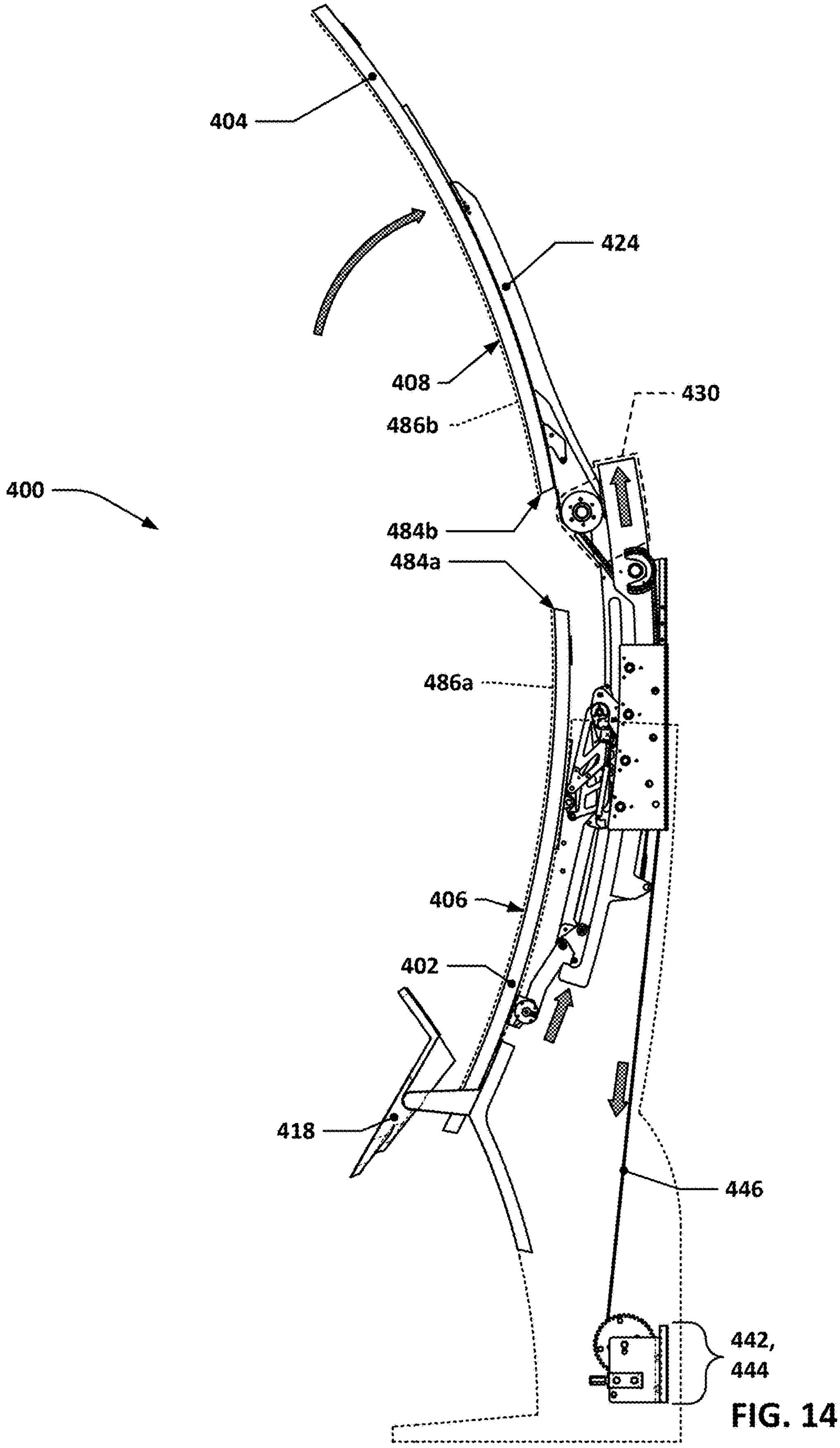

In FIG. 13, the transition of the electronic gaming machine 400 to the deployed configuration continues, with the winch mechanism 444 continuing to pull the movable portion 440 of the support structure 422 upwards, thereby driving further rotation of the first mount 424 about the first axis 428. In FIG. 14, the movable portion 440 of the support structure 422 has been elevated to its maximum height, and the first mount 424 has rotated about the first axis 428 to its final, deployed position, i.e., the second rotational position. At this stage, the electronic gaming machine 400 is in its maximum-height state, but the deployment of the electronic gaming machine 400 is not fully complete. In some implementations, the first mount 424 may rotate through an angle of 100° to 180° when transitioning between the first rotational position and the second rotational position.

The electronic gaming machine 400 may be equipped with locks, stops, latches, or other mechanisms that may be engaged when the movable portion 440 of the support structure 422 is at its maximum height in order to lock the movable portion 440 of the support structure 422 in place relative to the stationary portion 438 of the support structure 422, thereby taking the load off of the strap 446 and the winch mechanism 444.

Figure 15:
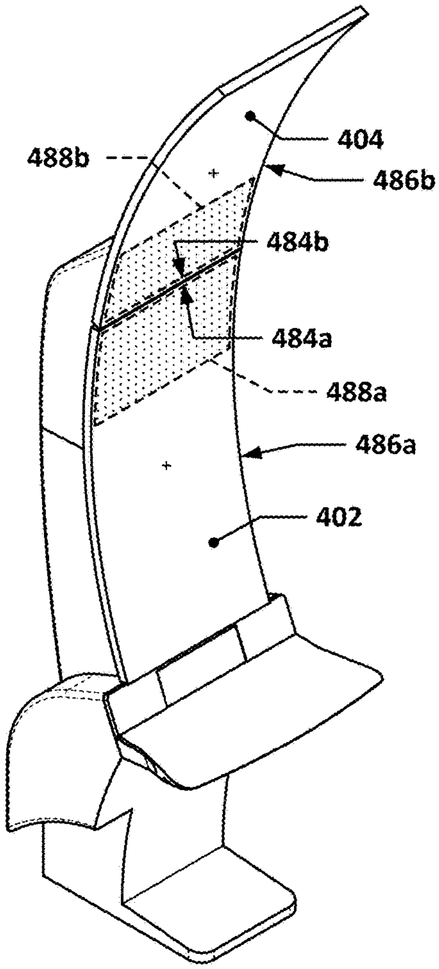
Figure 15:
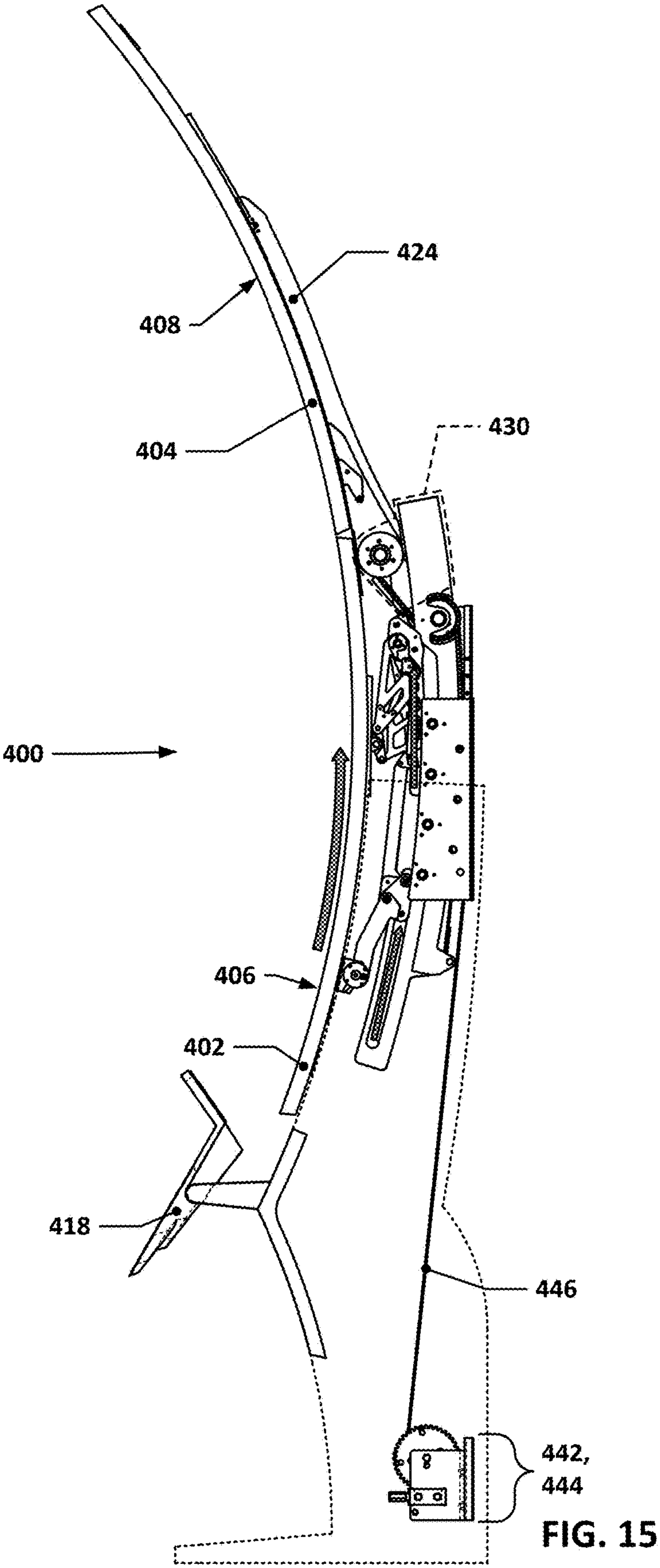

In FIG. 15, the process of deploying the electronic gaming machine 400 continues, with the second portion 432, and the second mount 426 connected thereto, being slid upward from the second configuration to the first configuration, thereby placing the second portion 432 closer to the first axis 428 than when in the second configuration and placing a first edge 484*a* of the main display panel 402 or the main display surface 406 adjacent to a first edge 484*b* of the secondary display panel 404 or the secondary display surface 408. The first edges 484*a* and 484*b* may, for example, be the edges of the display panels 402 and 404 that are closest to, and parallel to, the first axis 428. Such movement allows part of the secondary display panel 404 to occupy the same space, when in the first rotational position relative to the support structure 422, that is occupied by the main display panel 402 when the second mount 426 is in the first configuration and the first mount 424 is in the second rotational position relative to the first portion 430 of the support structure 422.

The main display panel 402 may have a first portion 488*a* of the main display surface 406 that extends from the first edge 484*a* of the main display panel 402 or the main display surface 406 towards a center 489*a* of the main display panel 402 or the main display surface 406. Similarly, the secondary display panel 404 may have a first portion 488*b* of the secondary display surface 408 that extends from the first edge 484*b* of the secondary display panel 404 or the secondary display surface 408 towards a center 489*b* of the secondary display panel 404 of the secondary display surface 408.

As can be seen, the first portion 488*a* smoothly transitions to the first portion 488*b* when the first mount 424 is in the second rotational position and the second mount 426 and the second portion 432 of the support structure 422 are in the first configuration.

The main display surface 406 and the secondary display surface 408 may each have corresponding first side edges 486*a* and 486*b*, respectively, that each extend away from the first edge 484*a* and the first edge 484*b*, respectively. In the depicted example, the first side edges 486*a* and 486*b* are both curved. In some implementations, the first side edge 486*a* of the main display surface 406 and the first side edge 486*b* of the secondary display surface 408 may define different segments of a smooth curve when the first mount 424 is in the second rotational position. The smooth curve may, in some instances, be a parabolic or arcuate curve.

As can be seen in FIG. 15, the main display panel 402 and the secondary display panel 404 are now both in their deployed positions, and the electronic gaming machine 400 is fully deployed, except for the button deck 418 still being in a stowed position. In some implementations, further movement of the display panels may be unnecessary to transition the button deck 418 into its deployed configuration. In this example, the button deck 418 cannot be rotated into its deployed position since the top back edge of the button deck 418 will collide with the bottom edge of the main display panel 402.

In this case, the second mount 426 is configured to be a kinematic mount, allowing the main display panel 402 to be moved relative to the second portion 432 of the support structure 422. For example, the second mount 426 may include a plurality of links, e.g., a first link assembly 476 and a second link assembly 478. The first link assembly 476 and the second link assembly 478, each of which may be rotatably connected with both the main display panel 402 and the second portion 432 of the support structure 422, along with the main display panel 402 and the second portion 432 of the support structure 422, may, for example, form a four-bar linkage or similar kinematic linkage or mechanism that may allow the main display panel 402 to be pivoted upward and outward from the cabinet 410 while simultaneously clearing the first edge 484*b* of the secondary display panel 404. This may allow the button deck 418 to be rotated down into its deployed position.

Figure 16:
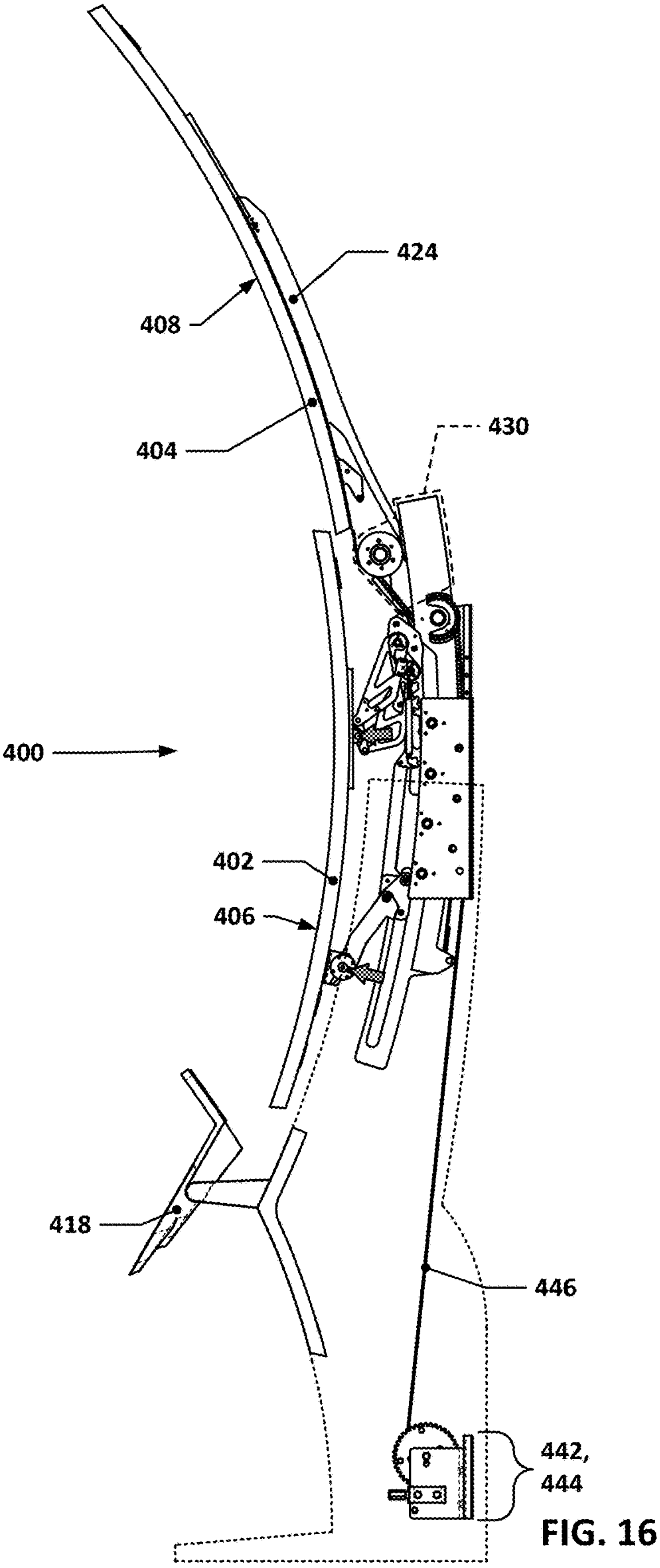
Figure 17:
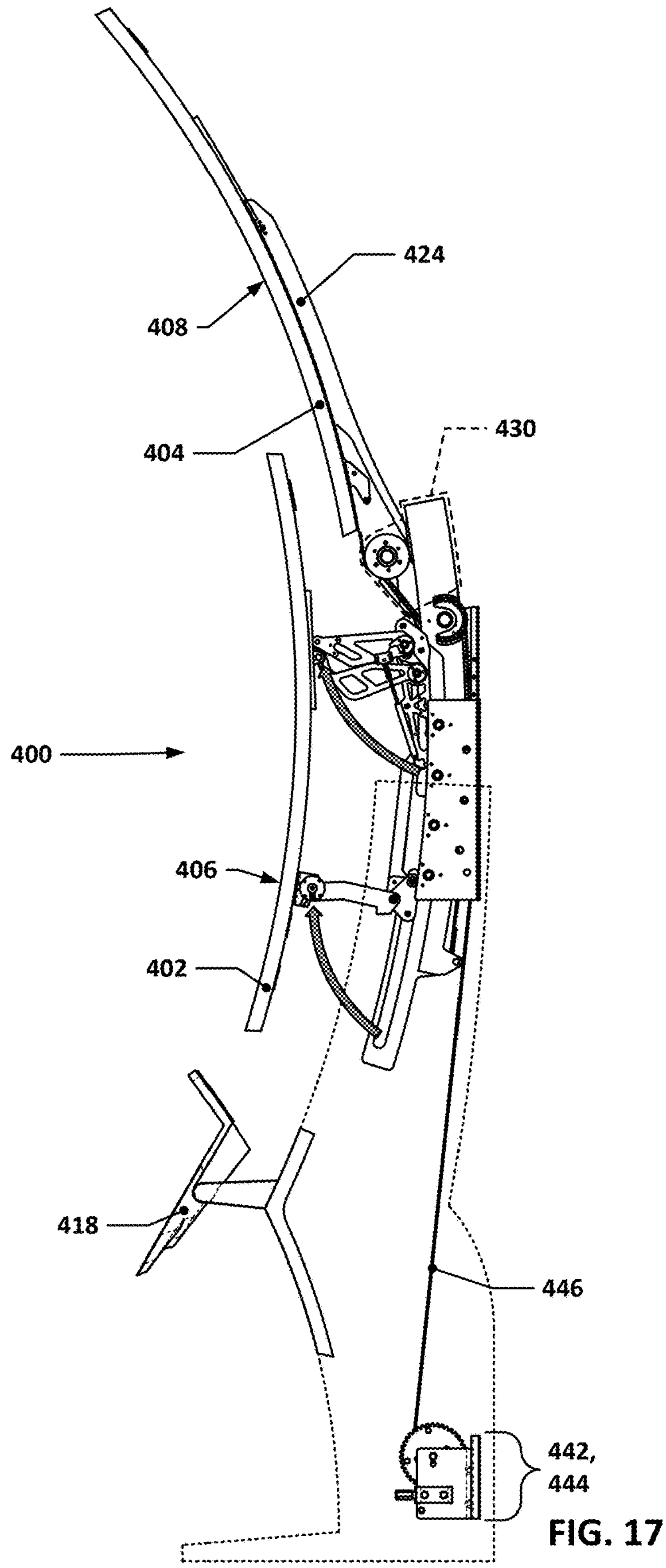
Figure 18:
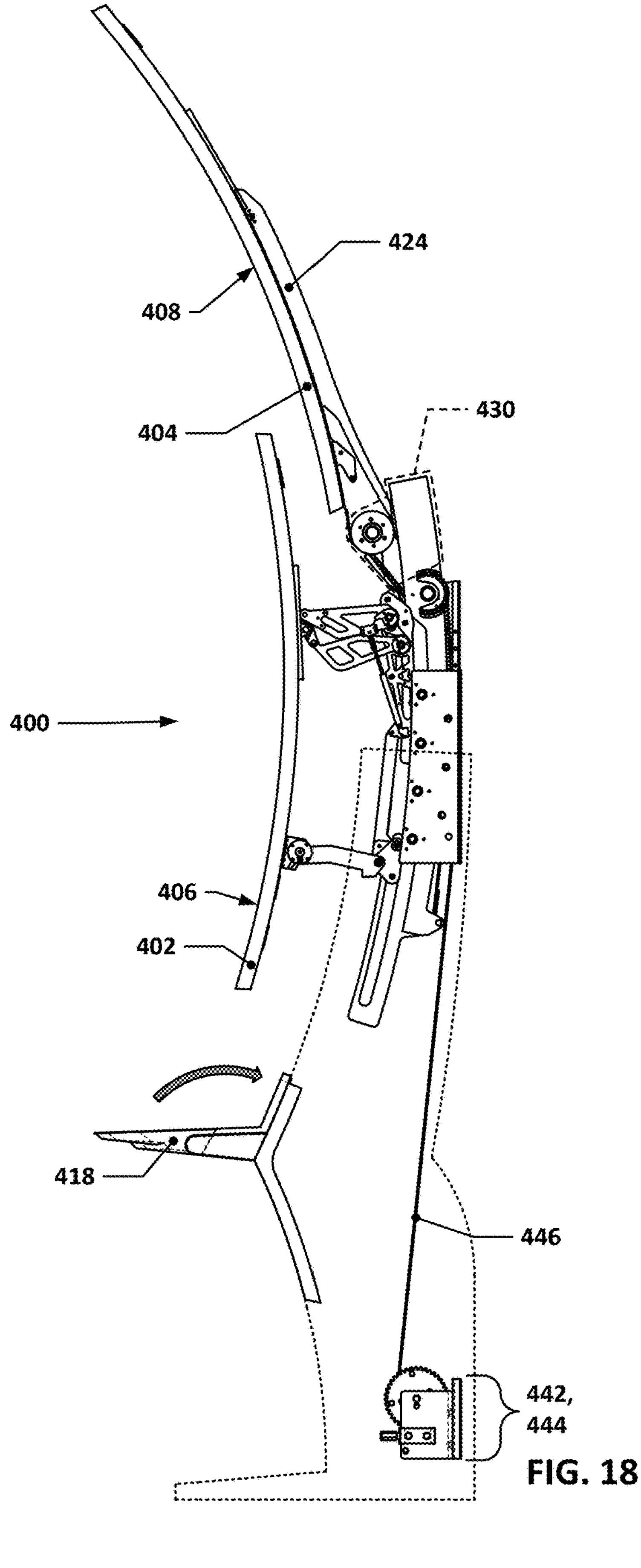

FIGS. 16 through 18 show such a kinematic mount in motion. For example, in FIG. 16, the main display panel has been pulled outward slightly, with the first edge 484*a* just clearing the first edge 484*b*. In FIG. 17, the main display panel has been pulled further upward and outward into an extended state, providing a significant amount of clearance between the back of the main display panel 402 and the cabinet 410, as well as between the bottom edge of the main display panel 402 and the button deck 418.

It will be noted that in this configuration, there is also easy access into the interior of the cabinet 410, allowing, for example, a technician to easily perform maintenance on components within the cabinet 410.

Figure 19:
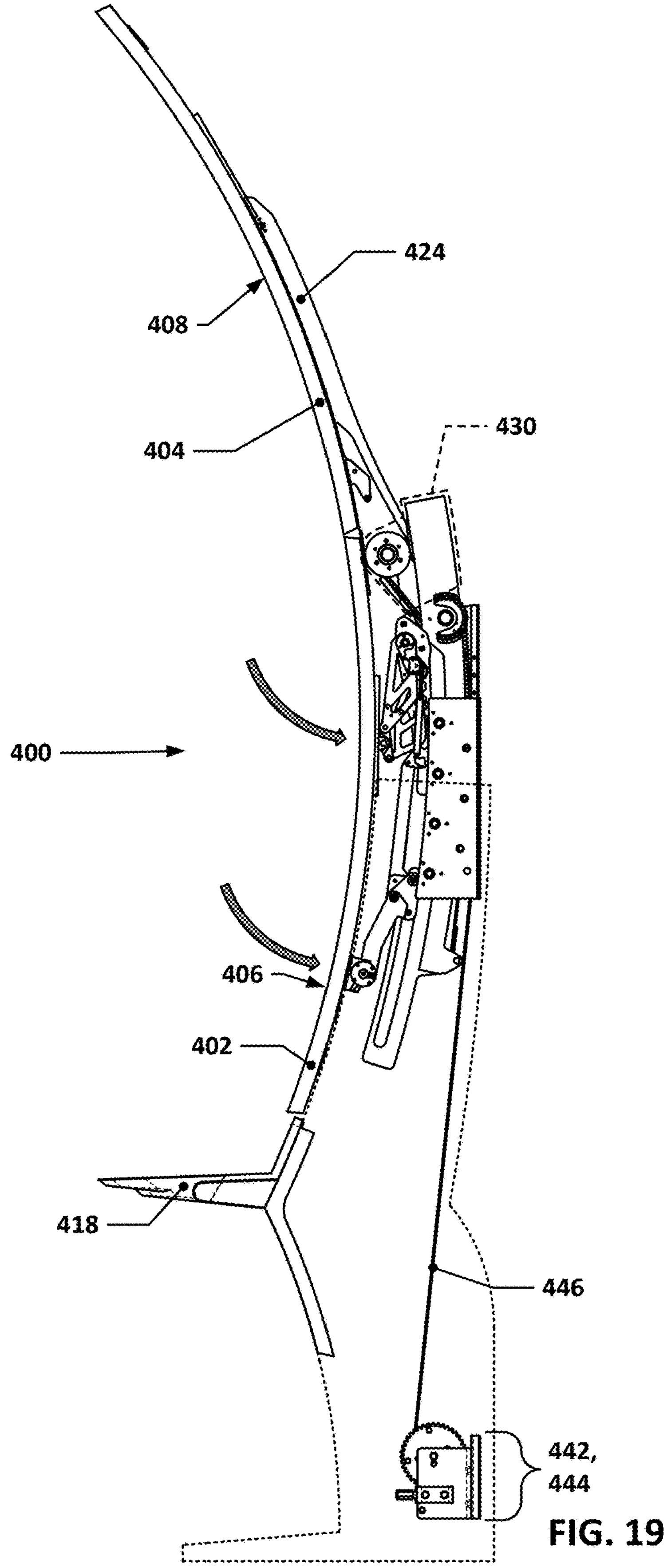

In FIG. 18, the button deck 418 has been rotated down from its stowed position, e.g., a shipping configuration, into its deployed position, e.g., an installed configuration. The main display panel 402 may then, as shown in FIG. 19, be moved downward and inward to return it to the position it was in in FIG. 15, e.g., a retracted state. At this point, the electronic gaming machine 400 is generally fully deployed, although the cowling 416 may still need to be installed.

It will be noted that in the configuration discussed above, the button deck 418 transitions from a configuration, e.g., a configuration in which the button deck 418 is in the shipping configuration, the second portion 432 of the support structure 422 is in the second configuration, and the movable portion 440 of the support structure 422 is in the stowed position, in which the button deck 418 occupies a region that is in between the main display panel 402 and the secondary display panel 404, to a configuration, e.g., in which the button deck 418 is in the installed configuration, the second portion 432 of the support structure 422 is in the first configuration, and the movable portion 440 of the support structure 422 is in the deployed position, in which the main display panel 402 is interposed between the button deck 418 and the secondary display panel 404.

It will also be understood that in a similar, alternate implementation, the button deck 418 may, instead of being pivotable, be slidable, e.g., mounted to linear glides or slides that allow the button deck 418 to be slid outward, away from the rear wall 412 of the cabinet 410 in order to create a similar gap between the back edge of the button deck 418 and the cabinet 410 that the main display panel 402 may retract into.

It will be apparent that the above-described systems may be implemented with varying degrees of motorization and/or automation. For example, in the example electronic gaming machine 400, the deployment of the display panels 402 and 404 is driven by human effort and/or common handheld tools, such as a cordless drill that may be interfaced with the winch mechanism 444 and used to provide a driving torque that actuates the winch mechanism 444. However, some electronic gaming machines 400 may incorporate one or more electrically driven actuators or motors that may be permanently installed within the cabinet 410 and controlled in order to drive some or all of the motions discussed herein.

Figure 20:
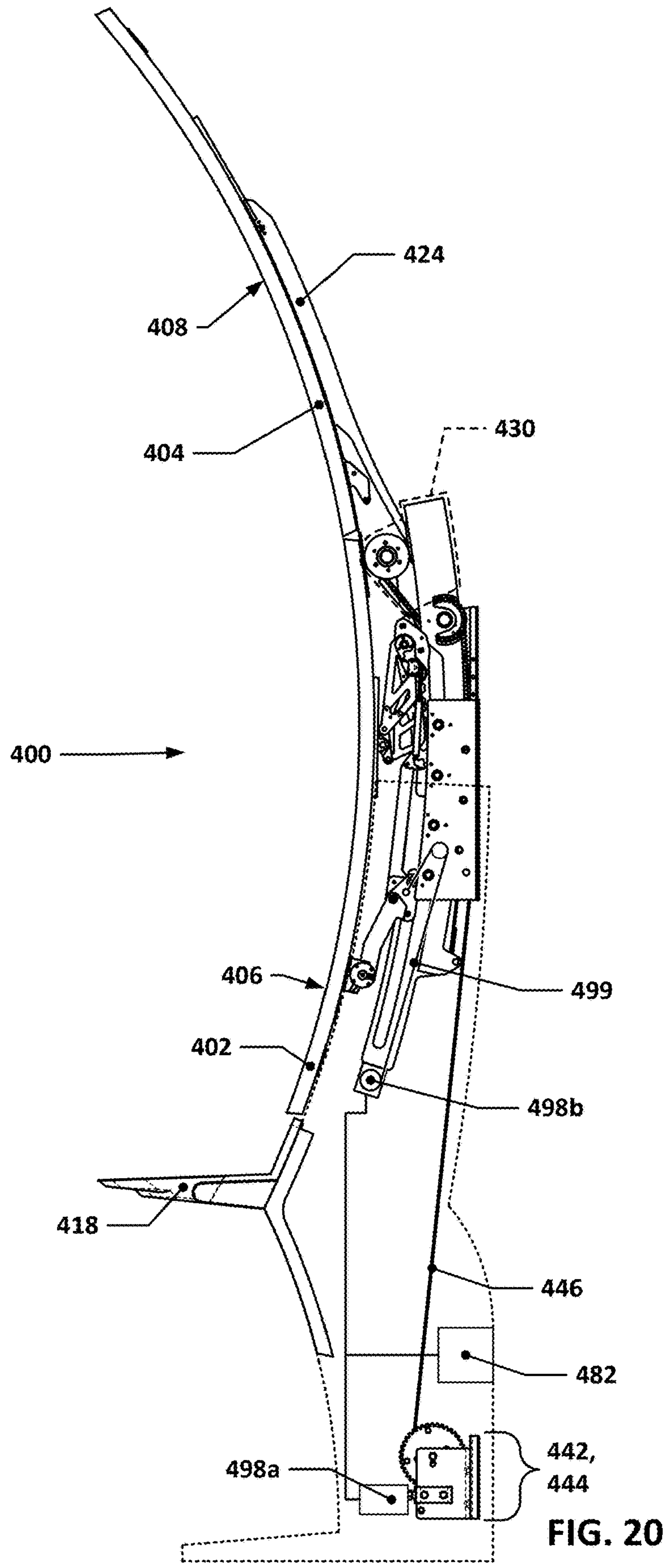
FIG. 20 depicts the example electronic gaming machine of FIG. 4 with motors installed to drive various features.

FIG. 20, for example, depicts the example electronic gaming machine 400 with motors 498*a* and 498*b* installed. The motor 498*a* is interfaced with the winch mechanism 444 such that actuating the motor 498*a* causes the winch mechanism 444 to either winch in or pay out the strap 446 to move the movable portion 440 of the support structure 422 between the stowed position and the deployed position. The motor 498*b*, similarly, may be interfaced with a strap 499 that may be looped over an idler, pulley, or similar structure before reversing to connect to the second portion 432, thereby allowing the motor 498*b* to pull the second portion 432 from the stowed position to the deployed position. The motors 498*a* and 498*b* may, for example, both be controlled by a controller 482 that may, for example, cause the motors 498*a* and 498*b* to be sequentially activated and/or operated simultaneously to cause the various elements of the electronic gaming machine to deploy as described herein. An additional motor or actuator may, for example, be included to power the movement of the button deck in a similar manner. However, given the additional cost of such motors and control systems, and the infrequency with which an electronic gaming machine may be transitioned between its deployed and stowed states, manually operated implementations (or implementations in which the motive force is provided by a handheld tool, such as a cordless drill) are likely to be more prevalent.

It will be readily apparent that electronic gaming machines may incorporate various permutations of the systems discussed herein. This has been discussed in various locations above, but several further examples are discussed below with respect to FIGS. 21 through 26. It will be understood that the examples of FIGS. 21 through 26 are examples only, and that features from one implementation discussed herein may be combined with features of another implementation discussed herein, e.g., to tailor the solutions disclosed herein to the particular aspects of a given electronic gaming machine.

Figure 21:
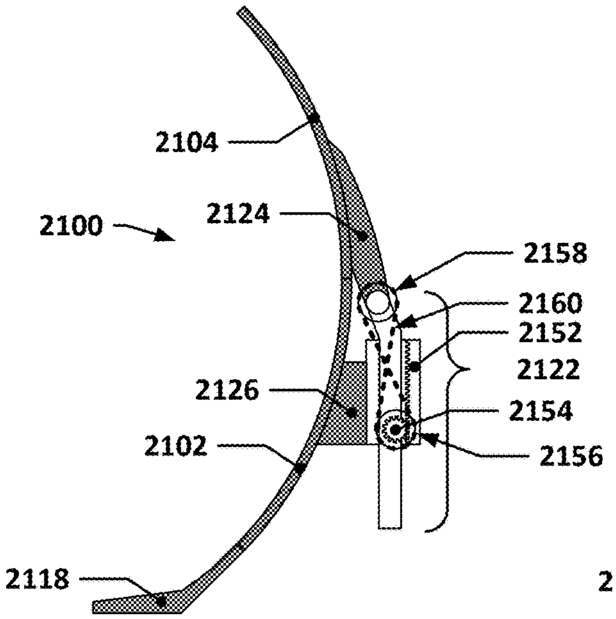
FIGS. 21 and 22 depict side schematic views of another example electronic gaming machine.
Figure 22:
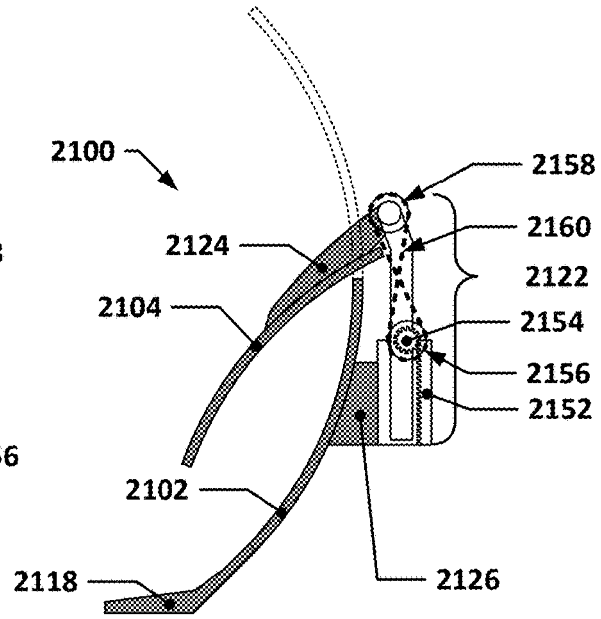

FIGS. 21 and 22 depict side schematic views of an electronic gaming machine 2100 that features two curved display panels, e.g., a main display panel 2102 and a secondary display panel 2104, that are respectively mounted to a first mount 2124 and a second mount 2126. FIG. 21 shows the electronic gaming machine 2100 in its deployed state while FIG. 22 depicts it in its stowed state. A button deck 2118 is positioned along the bottom edge of the main display panel 2102. The electronic gaming machine 2100 also includes a support structure 2122 that is similar, in some respects, to the support structure 422 discussed earlier herein. However, there are certain key differences between the support structure 422 and the support structure 2122.

For example, the second portion of the support structure 2122 does not move with the movable portion of the support structure 2122, but stays fixed with respect to the stationary portion of the support structure 2122. Moreover, the button deck 2118 also does not move and stays fixed in place relative to the stationary portion of the support structure 2122.

The support structure 2122 in this example supports a first mount 2124 that is rotatably connected with the movable portion of the support structure 2122, similar to the first mount 424 connected with the support structure 422. The stationary portion of the support structure 2122 also includes a rack 2154 that is engaged with a pinion 2156 that is mounted to the movable portion of the support structure 2122. The rack 2154 and the pinion 2156 are kinematically linked with the first mount 2124 by a chain 2160, similar to the mechanism of the electronic gaming machine 400. However, the chain 2160, in this example, is configured to cause the first mount 2124 to rotate in the opposite direction from the pinion 2156. The chain 2160, for example, may make a figure-8 shape instead of an oval or obround shape. It will be understood that, in order to do so, the "chain" 2160 may actually be two separate lengths of chain, neither of which forms a continuous loop. In such an instance, the ends of each chain may be connected to a different pair of sprockets and the two sets of sprockets mounted side-by-side in order to approximate a continuous chain without the attendant potential for the cross-over chain segments rubbing against one another.

Such a reversed kinematic linkage causes the first mount 2124 and the secondary display panel 2104 to pitch forward from the second rotational position to the first rotational position responsive to the movable portion of the support structure moving up relative to the stationary portion of the support structure 2122. This is behavior is the reverse of the mechanism in the electronic gaming machine 400, and allows the bottom edge of the secondary display panel 404 to move upward so as to provide increasing vertical clearance between the top edge of the main display panel 402 and the secondary display panel 404 as the secondary display panel 404 rotates into the first rotational position. This allows the main display panel 402 and the button deck 418 to remain stationary throughout the process of deploying the secondary display panel 2104. The electronic gaming machine 2100 may have a somewhat larger vertical footprint in such a configuration as opposed to that possessed by the electronic gaming machine 400, but there is still a significant reduction in the overall height of the electronic gaming machine 2100 that can be achieved with such a system.

Figure 23:
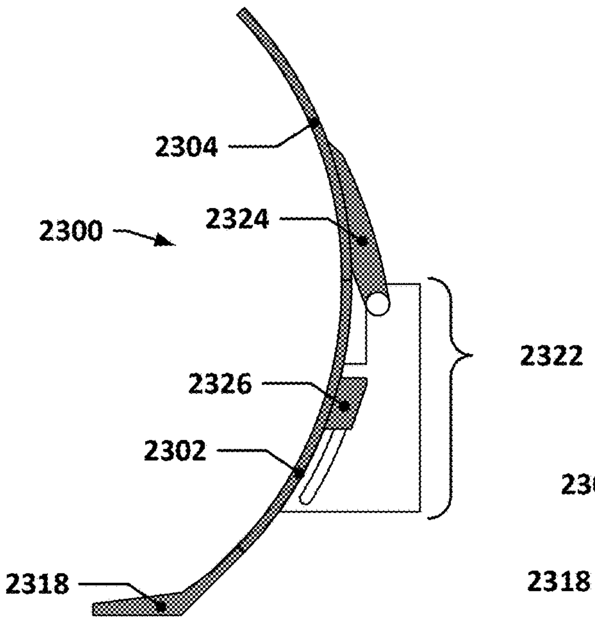
FIGS. 23 and 24 depict side schematic views of yet another example electronic gaming machine.
Figure 24:
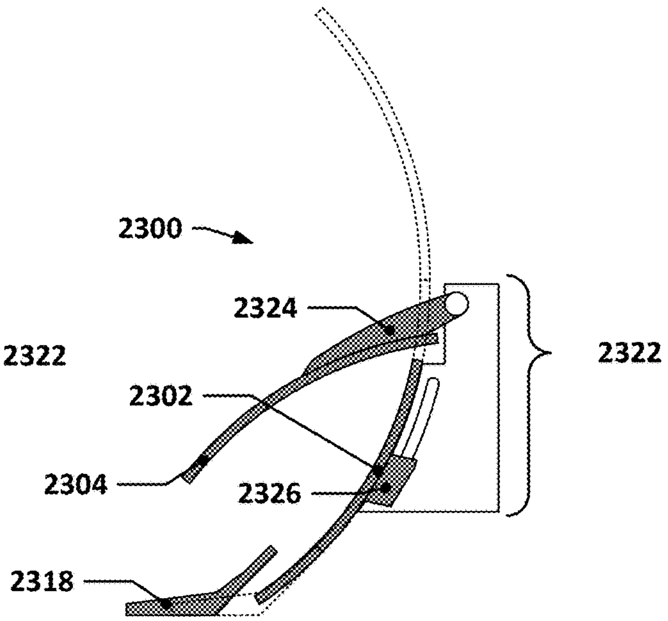

FIGS. 23 and 24 depict side schematic views of an electronic gaming machine 2300 that features two curved display panels, e.g., a main display panel 2302 and a secondary display panel 2304, that are respectively mounted to a first mount 2324 and a second mount 2326. FIG. 23 shows the electronic gaming machine 2300 in its deployed state while FIG. 24 depicts it in its stowed state. A button deck 2318 is positioned along the bottom edge of the main display panel 2302. The electronic gaming machine 2300 also includes a support structure 2322 that is similar, in some respects, to the support structure 422 discussed earlier herein. However, there are certain key differences between the support structure 422 and the support structure 2322.

For example, it will be apparent that the movable portion of the support structure 2322 is limited to the second portion that supports the second mount 2326; the first portion of the support structure 2322 that supports the first mount 2324 does not move. Thus, when the first mount 2324 moves from the second rotational position to the first rotational position, the axis about which it rotates does not change in height or elevation.

Another difference between the electronic gaming machine 2300 and the electronic gaming machine 400 is that the button deck 2318 is attached to the cabinet (not shown) via linear slides, e.g., like a drawer, and is thus able to be slid horizontally outward from the position shown in FIG. 23 in order to provide a gap between the button deck 2318 and the cabinet (not shown) through which the main display panel 2302 may slide when the second mount 2326 is slid downward to allow the first mount 2324 to be rotated downward into the first rotational position (as shown in FIG. 24.

Figure 25:
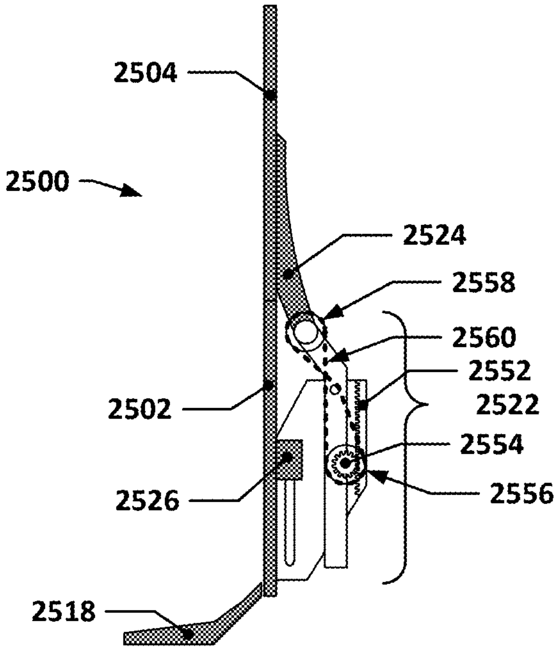
FIGS. 25 and 26 depict side schematic views of a further example electronic gaming machine.
Figure 26:
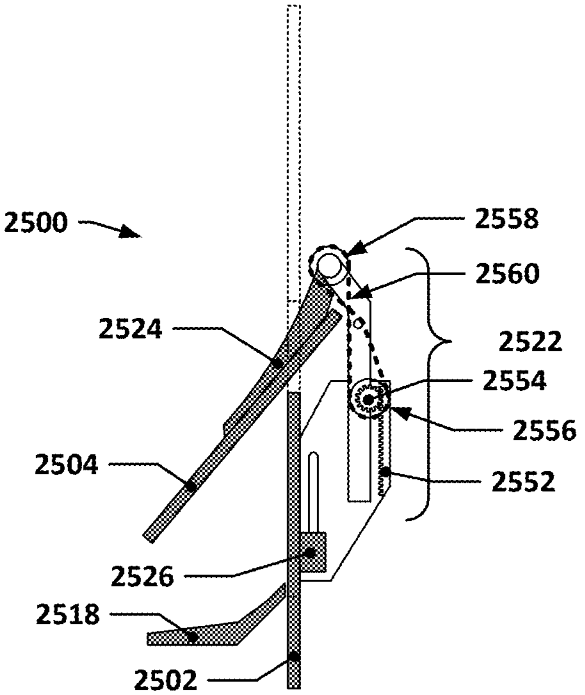

FIGS. 25 and 26 depict an example electronic gaming machine 2500 that is configured similarly to the electronic gaming machines 2100 and 2300 except that the main display panel 2502 and the secondary display panel 2504 are both flat, not curved. As a result, there is less vertical clearance between the secondary display panel 2504 and the main display panel 2302 when the secondary display panel 2504 is rotated into the first rotational position (as shown in FIG. 26). To compensate for this, the electronic gaming machine 2500 incorporates a support structure 2522 that has a reverse-kinematic linkage between the first mount 2524 and the rotation of the sprocket 2554, such that the first axis about which the secondary display panel 2504 rotates moves downward as the first mount 2524 rotates upwards to the second rotational position.

The second portion of the support structure 2522 is, in this example, able to slide between an elevated and a lowered position. In the lowered position, the main display panel 2502 may be withdrawn from a region where it is normally located in order to provide additional clearance for the secondary display panel 2504 when in the first rotational position.

It will also be observed that the button deck 2518 in this example is also stationary. However, it may be offset from the cabinet to form a permanent gap that the main display panel 2502 resides in, thereby allowing the main display panel 402 to slide vertically downward past the inner edge of the button deck 2518.

It will be understood that elements of FIGS. 21 through 26 not explicitly described above but having callouts where the last two digits are shared with the last two digits of elements discussed earlier herein may generally be assumed to be similar to such earlier-discussed elements, and that the discussion of such earlier elements is also applicable to the versions of such elements depicted in FIGS. 21 through 26, unless otherwise indicated or apparent.

It is to be understood that the phrases "for each <item> of the one or more <items>," "each <item> of the one or more <items>," or the like, if used herein, are inclusive of both a single-item group and multiple-item groups, i.e., the phrase "for . . . each" is used in the sense that it is used in programming languages to refer to each item of whatever population of items is referenced. For example, if the population of items referenced is a single item, then "each" would refer to only that single item (despite the fact that dictionary definitions of "each" frequently define the term to refer to "every one of two or more things") and would not imply that there must be at least two of those items. Similarly, the term "set" or "subset" should not be viewed, in itself, as necessarily encompassing a plurality of items—it will be understood that a set or a subset can encompass only one member or multiple members (unless the context indicates otherwise).

The use, if any, of ordinal indicators, e.g., (a), (b), (c) . . . or the like, in this disclosure and claims is to be understood as not conveying any particular order or sequence, except to the extent that such an order or sequence is explicitly indicated. For example, if there are three steps labeled (i), (ii), and (iii), it is to be understood that these steps may be performed in any order (or even concurrently, if not otherwise contraindicated) unless indicated otherwise. For example, if step (ii) involves the handling of an element that is created in step (i), then step (ii) may be viewed as happening at some point after step (i). Similarly, if step (i) involves the handling of an element that is created in step (ii), the reverse is to be understood. It is also to be understood that use of the ordinal indicator "first" herein, e.g., "a first item," should not be read as suggesting, implicitly or inherently, that there is necessarily a "second" instance, e.g., "a second item."

It should be appreciated that all combinations of the foregoing concepts (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. It should also be appreciated that terminology explicitly employed herein that also may appear in any disclosure incorporated by reference should be accorded a meaning most consistent with the particular concepts disclosed herein.

It is to be further understood that the above disclosure, while focusing on a particular example implementation or implementations, is not limited to only the discussed example, but may also apply to similar variants and mechanisms as well, and such similar variants and mechanisms are also considered to be within the scope of this disclosure.

What is claimed is:

1. An apparatus comprising:

a cabinet having a base and incorporating a support structure having a first portion and a second portion;

a main display panel;

an auxiliary device that is one of a secondary display panel and a topper;

a first mount connected with, and supported by, the first portion of the support structure; and a second mount connected with, and supported by, the second portion of the support structure, wherein:

the base of the cabinet is configured to rest on a horizontal surface, the main display panel is attached to, and supported by, the first mount, the auxiliary device is attached to the second mount, the first mount is rotatably connected with the first portion of the support structure so as to be rotatable about a first axis and between a first rotational position relative to the first portion of the support structure and a second rotational position relative to the first portion of the support structure, the second mount is positioned between the second portion of the support structure and at least a portion of the first mount when the first mount is in the first rotational position relative to the first portion of the support structure, the first axis is between the base of the cabinet and the auxiliary device when the first mount is in the second rotational position relative to the first portion of the support structure, the main display panel is between the first axis and the base of the cabinet when the first mount is in the first rotational position relative to the first portion of the support structure, and a maximum height of the apparatus relative to the base of the cabinet is greater when the first mount is in the second rotational position relative to the first portion of the support structure as compared to when the first mount is in the first rotational position relative to the first portion of the support structure.

2. The apparatus of claim 1, wherein the amount of angular rotation that the first mount undergoes when transitioning between the first rotational position relative to the first portion of the support structure and the second rotational position relative to the first portion of the support structure is between 100° and 180°.

3. The apparatus of claim 1, wherein:

the support structure has a stationary portion and a movable portion, the movable portion includes the first portion of the support structure and the second portion of the support structure, the first axis is fixed in space relative to the movable portion, the movable portion is configured to be movable along a first path relative to the stationary portion and between a stowed position and a deployed position, and the first mount is kinematically linked with the stationary portion such that the first mount rotates from the first rotational position relative to the first portion of the support structure to the second rotational position relative to the first portion of the support structure when the movable portion is moved from the stowed position to the deployed position.

4. The apparatus of claim 3, wherein:

the support structure includes a rack and pinion, the rack is part of the stationary portion, the pinion is part of the movable portion, and the pinion is engaged with the rack and is kinematically linked with the first mount such that rotation of the pinion causes rotation of the first mount about the first axis.

5. The apparatus of claim 4, further comprising:

a drive sprocket connected with the pinion and a driven sprocket connected with the first mount; and a chain spanning between the driven sprocket and the drive sprocket, wherein the chain is engaged with teeth on the driven sprocket and teeth on the drive sprocket.

6. The apparatus of claim 4, further comprising:

a drive pulley connected with the pinion and a driven pulley connected with the first mount; and a belt spanning between the driven pulley and the drive pulley, wherein the belt is engaged with the driven pulley and the drive pulley.

7. The apparatus of claim 4, wherein:

one of the movable portion and the stationary portion includes an arcuate guide, the other of the movable portion and the stationary portion includes a plurality of guide engagement features that contact the arcuate guide, the rack has teeth arranged along a second path, and the first path and the second path are both arcuate.

8. The apparatus of claim 7, wherein:

the first path and the second path are concentric to within ±1 inch, and the first path and the second path each have a corresponding radius that is greater than or equal to 70 inches.

9. The apparatus of claim 8, further comprising:

a gaming controller, wherein:

the stationary portion of the support structure is fixed with respect to the cabinet, and the gaming controller is positioned between the stationary portion of the support structure and the base of the cabinet, and between the movable portion of the support structure and a rear wall of the cabinet.

10. The apparatus of claim 8, wherein:

the auxiliary device is the secondary display panel, the main display panel has a main display surface, the secondary display panel has a secondary display surface, the second mount and the second portion of the support structure are configured to be placed into at least a first configuration relative to the first portion of the support structure, the main display surface has a first edge that is closest to the first axis, the secondary display surface has a first edge that is closest to the first axis, the main display surface has a first portion that extends from the first edge of the main display surface towards a center of the main display surface, the secondary display surface has a first portion that extends from the first edge of the secondary display surface towards a center of the secondary display surface, the first edge of the main display surface and the first edge of the secondary display surface are adjacent one another when the first mount is in the second rotational position relative to the first portion of the support structure and the second mount and the second portion of the support structure are in the first configuration, the first portion of the main display surface smoothly transitions to the first portion of the secondary display surface when the first mount is in the second rotational position relative to the first portion of the support structure and the second mount and the second portion of the support structure are in the first configuration, and the main display surface faces towards the secondary display surface, and vice-versa, when the first mount is in the first rotational position relative to the first portion of the support structure.

11. The apparatus of claim 10, wherein:

the main display surface has a first side edge that is curved and that extends away from the first edge of the main display surface, the secondary display surface has a first side edge that is curved and that extends away from the first edge of the secondary display surface, and the first side edge of the main display surface and the first side edge of the secondary display surface define different segments of a smooth curve when the first mount is in the second rotational position relative to the first portion of the support structure.

12. The apparatus of claim 11, wherein the smooth curve is arcuate or parabolic.

13. The apparatus of claim 11, wherein the first side edge of the main display surface and the first side edge of the secondary display surface are both arcuate.

14. The apparatus of claim 10, wherein:

the second mount and the second portion of the support structure are further configured to also be placed into at least a second configuration relative to the first portion of the support structure, the second mount and the second portion of the support structure are configured to be movable along a second path and relative to the first portion of the support structure in order to transition between the first configuration and the second configuration, the second portion of the support structure is closer to the first axis when the second mount and the second portion of the support structure are in the first configuration than when in the second configuration, and part of the auxiliary device, when the first mount is in the first rotational position relative to the first portion of the support structure and the second mount and the second portion of the support structure are in the second configuration, occupies a region occupied by part of the main display panel when the second mount and the second portion of the support structure are in the first configuration and the first mount is in the second rotational position relative to the first portion of the support structure.

15. The apparatus of claim 14, wherein:

the second mount includes a) a first link assembly that is rotatably connected with both the second portion of the support structure and the main display panel and b) a second link assembly that is rotatably connected with both the second portion of the support structure and the main display panel, the first link assembly and the second link assembly form part of a kinematic linkage that is configured such that the main display panel is movable between an extended state relative to the second portion of the support structure and a retracted state relative to the second portion of the support structure, and the main display panel is further from the first portion of the support structure when in the extended state as compared with when the main display panel is in the retracted state.

16. The apparatus of claim 14, further comprising a button deck, wherein:

the stationary portion of the support structure is fixed relative to the cabinet, at least the second portion of the support structure is between the main display panel and a rear wall of the cabinet, the button deck is rotatable between a shipping configuration and an installed configuration, the button deck, when the button deck is in the shipping configuration, the second portion of the support structure is in the second configuration, and the movable portion of the support structure is in the stowed position, occupies a region that is in between the main display panel and the auxiliary device, and the main display panel, when the button deck is in the installed configuration, the second portion of the support structure is in the first configuration, and the movable portion of the support structure is in the deployed position, is interposed between the button deck and the auxiliary device.

17. The apparatus of claim 14, further comprising a button deck, wherein:

the stationary portion of the support structure is fixed with respect to the cabinet, at least the second portion of the support structure is between the main display panel and a rear wall of the cabinet, the button deck is slidable between a shipping configuration and an installed configuration, the button deck, when the button deck is in the shipping configuration, the second portion of the support structure is in the second configuration, and the movable portion of the support structure is in the stowed position, occupies a region that is in between the main display panel and the auxiliary device, and the main display panel, when the button deck is in the installed configuration, the second portion of the support structure is in the first configuration, and the movable portion of the support structure is in the deployed position, is interposed between the button deck and the auxiliary device.

18. The apparatus of claim 3, further comprising an actuator configured to move the movable portion of the support structure from the stowed position to the deployed position responsive to receipt of one or more inputs.

19. The apparatus of claim 18, wherein:

the actuator is a winch mechanism with a cable, strap, or chain, the stationary portion of the support structure is fixed with respect to the cabinet, the winch mechanism has a base that is fixed with respect to the cabinet and located between a base of the cabinet and the stationary portion of the support structure, and the cable, strap, or chain of the winch mechanism extends from the winch mechanism and into the stationary portion of the support structure before reversing direction and connecting with the movable portion of the support structure.

20. The apparatus of claim 18, further comprising:

a motor configured to drive the actuator, and a controller configured to control the motor so as to drive the actuator and move the movable portion of the support structure from the stowed position to the deployed position.

* * * * *